(12) United States Patent
Mathur et al.

(10) Patent No.: US 12,032,502 B2
(45) Date of Patent: Jul. 9, 2024

(54) METHOD AND ELECTRONIC DEVICE FOR COMMUNICATION ON SINGLE WIRE INTERFACE PRELIMINARY CLASS

(71) Applicant: SAMSUNG ELECTRONICS CO., LTD., Suwon-si (KR)

(72) Inventors: Aniroop Mathur, Ajmer (IN); Archit Tekriwal, Howrah (IN); Anil Kumar, Gautam Buddh Nagar (IN); Kuldeep Kumar, Mahoba (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/115,474

(22) Filed: Feb. 28, 2023

(65) Prior Publication Data

US 2023/0229608 A1 Jul. 20, 2023

Related U.S. Application Data

(63) Continuation of application No. PCT/KR2023/001059, filed on Jan. 20, 2023.

(30) Foreign Application Priority Data

Jan. 20, 2022 (IN) .............................. 202241003263

(51) Int. Cl.
  *G06F 13/26* (2006.01)
  *G06F 3/023* (2006.01)
(52) U.S. Cl.
  CPC .............. *G06F 13/26* (2013.01); *G06F 3/023* (2013.01)

(58) Field of Classification Search
  CPC ........... G06F 13/26; G06F 3/023; G06F 13/24
  See application file for complete search history.

(56) References Cited

U.S. PATENT DOCUMENTS

| 6,330,977 B1 * | 12/2001 | Hass ................. G06K 19/0706 |
| | | 235/487 |
| 7,328,294 B2 | 2/2008 | Kim et al. |
| 8,751,703 B2 | 6/2014 | Hatula et al. |
| 8,760,321 B2 | 6/2014 | Chiu |

(Continued)

FOREIGN PATENT DOCUMENTS

| EP | 0782273 B1 | 11/2003 |
| JP | 10-124224 A | 5/1998 |

(Continued)

OTHER PUBLICATIONS

International Search Report (PCT/ISA/210) and Written Opinion (PCT/ISA/237) issued by the International Searching Authority dated Apr. 21, 2023 in corresponding International Application No. PCT/KR2023/001059.

*Primary Examiner* — Sahlu Okebato
(74) *Attorney, Agent, or Firm* — Sughrue Mion, PLLC

(57) ABSTRACT

A first electronic device for communication with a second electronic device on a single wire interface, includes: a memory; and a processor executing an application stored in the memory. The processor is configured to: receive, from the second electronic device, interrupt signals related with a frequency and a time space, over the single wire interface; decode an input data associated with the interrupt signals based on an interrupt protocol table; and provide the decoded input data to the application on the first electronic device.

20 Claims, 36 Drawing Sheets

(56) References Cited

U.S. PATENT DOCUMENTS

| | | | |
|---|---|---|---|
| 9,665,508 B2 | 5/2017 | Snyder, II et al. | |
| 11,461,255 B2 | 10/2022 | Wei | |
| 2015/0074306 A1 | 3/2015 | Ayyagari et al. | |
| 2016/0350242 A1* | 12/2016 | Lee | G06F 13/24 |
| 2020/0264917 A1* | 8/2020 | Kraemer | G06F 13/24 |
| 2020/0264994 A1 | 8/2020 | Raisch et al. | |
| 2020/0356501 A1* | 11/2020 | Krause | G06F 13/4282 |

FOREIGN PATENT DOCUMENTS

| | | |
|---|---|---|
| KR | 10-2006-0088629 A | 8/2006 |
| WO | 2013/135946 A2 | 9/2013 |
| WO | 2021/087418 A1 | 5/2021 |

* cited by examiner

FIG. 3J

Old Interrupt Protocol Table

| Key | Interrupt Count | Time Duff (us) |
|---|---|---|
| KEY_DOWN | 9 | 3 |
| KEY_UP | 3 | 9 |
| KEY_LEFT | 28 | 1 |
| KEY_RIGHT | 14 | 2 |
| KEY_SPACE | 7 | 4 |
| KEY_CTRL | 31 | 1 |
| KEY_ENTER | 15 | 2 |

New Interrupt Protocol Table

| Key | Interrupt Count | Time Duff (us) |
|---|---|---|
| KEY_DOWN | 6 | 1 |
| KEY_UP | 5 | 1 |
| KEY_LEFT | 4 | 1 |
| KEY_RIGHT | 3 | 2 |
| KEY_SPACE | 7 | 1 |
| KEY_CTRL | 8 | 1 |
| KEY_ENTER | 4 | 2 |

FIG. 4F
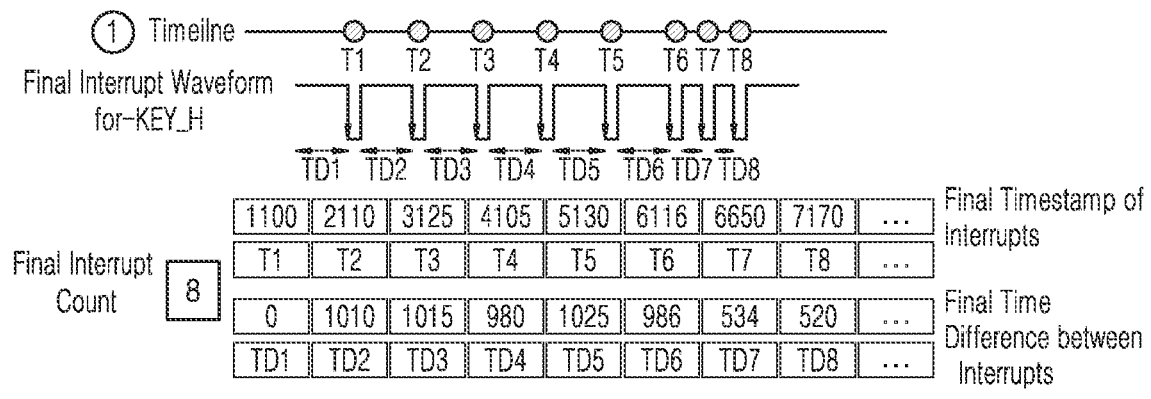
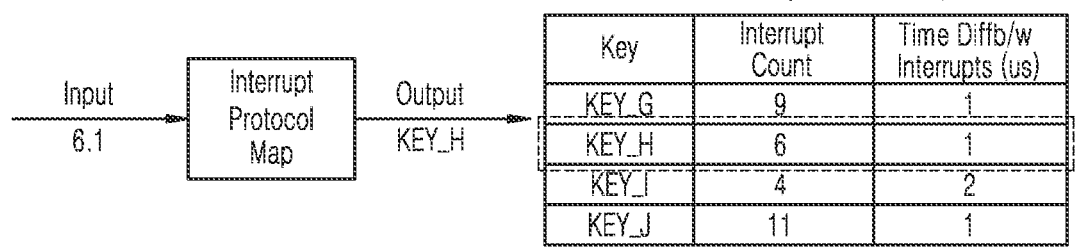
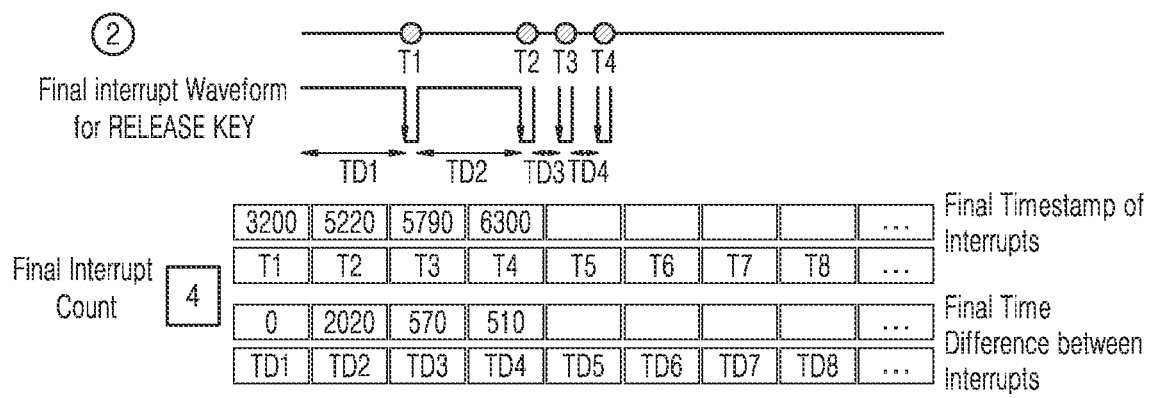
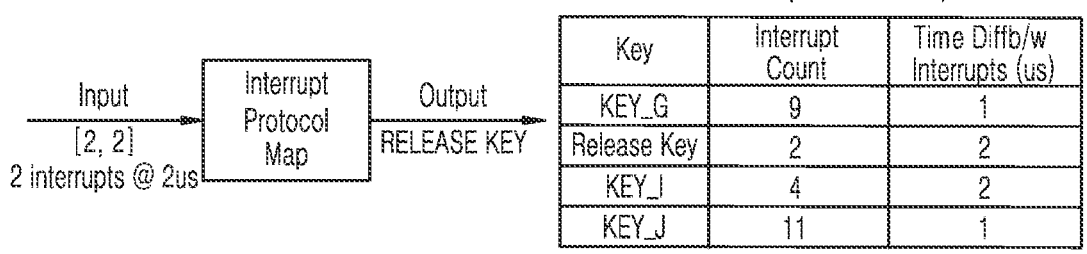

FIG. 4H
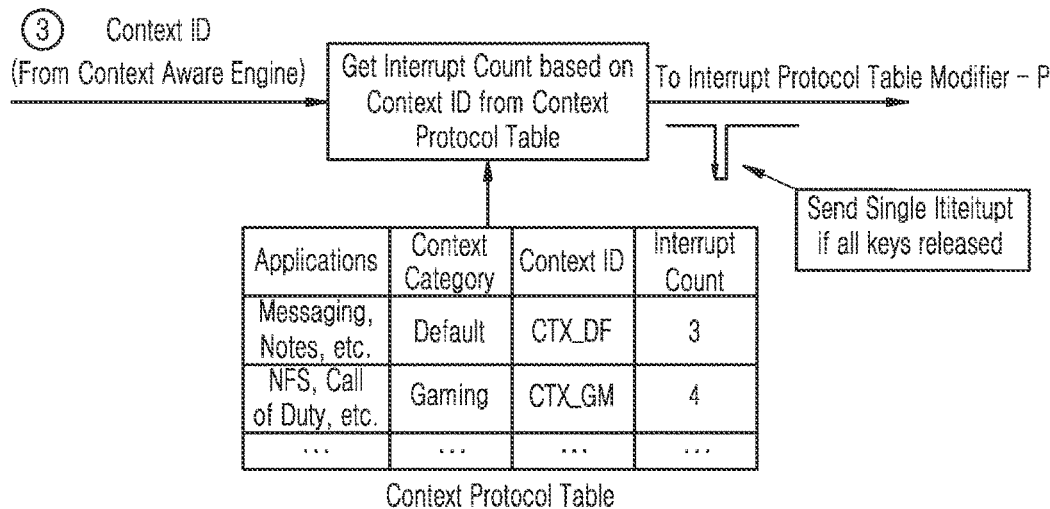
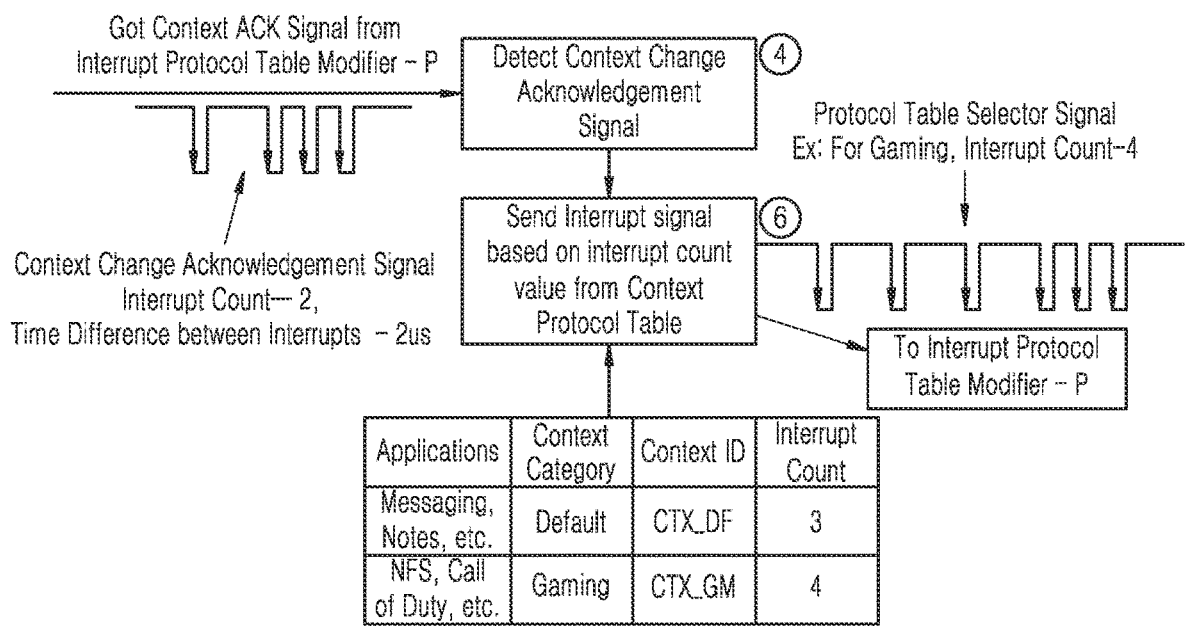

FIG. 4I

Old Interrupt Protocol Table

| Key | Interrupt Count | Time Duff (us) |
|---|---|---|
| KEY_DOWN | 9 | 3 |
| KEY_UP | 3 | 9 |
| KEY_LEFT | 28 | 1 |
| KEY_RIGHT | 14 | 2 |
| KEY_SPACE | 7 | 4 |
| KEY_CTRL | 31 | 1 |
| KEY_ENTER | 15 | 2 |

⑦

New Interrupt Protocol Table

| Key | Interrupt Count | Time Duff (us) |
|---|---|---|
| KEY_DOWN | 4 | 1 |
| KEY_UP | 5 | 1 |
| KEY_LEFT | 6 | 1 |
| KEY_RIGHT | 3 | 2 |
| KEY_SPACE | 7 | 1 |
| KEY_CTRL | 8 | 1 |
| KEY_ENTER | 4 | 2 |

FIG. 6A

| Applications | Context Category | Priority Level – Keyset |
|---|---|---|
| Notepad, Messaging, etc. | Typing | Priority Level 1 – Vowels<br>Priority Level 2 – Consonants<br>Priority Level 3 – Space/Enter/Backspace/Shift<br>Priority Level 4 – Punctuations<br>Priority Level 5 – Numeric Keys<br>Priority Random – Other Keys |
| NFS, Call of Duty, etc. | Gaming | Priority Level 1 – Arrow Keys<br>Priority Level 2 – Space/Enter/Control<br>Priority Level 3 – W, A, S, D<br>Priority Random – Other Keys |
| Calculator, Dialer, etc. | Numeric Keypad | Priority Level 1 – Numeric Keys<br>Priority Random – Other Keys |
| ... | ... | ... |

Minimum Input Latencies

Latency increases

Maximum Input Latencies

FIG. 6B

Typing Context

| Interrupt Count | Time Diff(us) | Input Latency (us) | Key |
|---|---|---|---|
| 4 | 1 | 4 us | KEY_A |
| 5 | 1 | 5 us | KEY_E |
| 6 | 1 | 6 us | KEY_I |
| 3 | 2 | 6 us | KEY_O |
| 7 | 1 | 7 us | KEY_U |
| 8 | 1 | 8 us | KEY_B |
| 4 | 2 | 8 us | KEY_C |
| 9 | 1 | 9 us | KEY_D |
| 3 | 3 | 9 us | KEY_F |
| ... | ... | ... | ... |
| 17 | 1 | 17 us | KEY_Z |

Vowels (PRIORITY LEVEL 1): KEY_A, KEY_E, KEY_I, KEY_O, KEY_U
Consonants (PRIORITY LEVEL 2): KEY_B, KEY_C, KEY_D, KEY_F, ..., KEY_Z Input Latency Increases →

Numeric Keypad Context

| Interrupt Count | Time Diff(us) | Input Latency (us) | Key |
|---|---|---|---|
| 4 | 1 | 4 us | KEY_0 |
| 5 | 1 | 5 us | KEY_1 |
| 6 | 1 | 6 us | KEY_2 |
| 3 | 2 | 6 us | KEY_3 |
| 7 | 1 | 7 us | KEY_4 |
| 8 | 1 | 8 us | KEY_5 |
| 4 | 2 | 8 us | KEY_6 |
| 9 | 1 | 9 us | KEY_7 |
| 3 | 3 | 9 us | KEY_8 |
| 10 | 1 | 10 us | KEY_9 |
| ... | ... | ... | ... |

Numeric Keys (PRIORITY LEVEL 1)

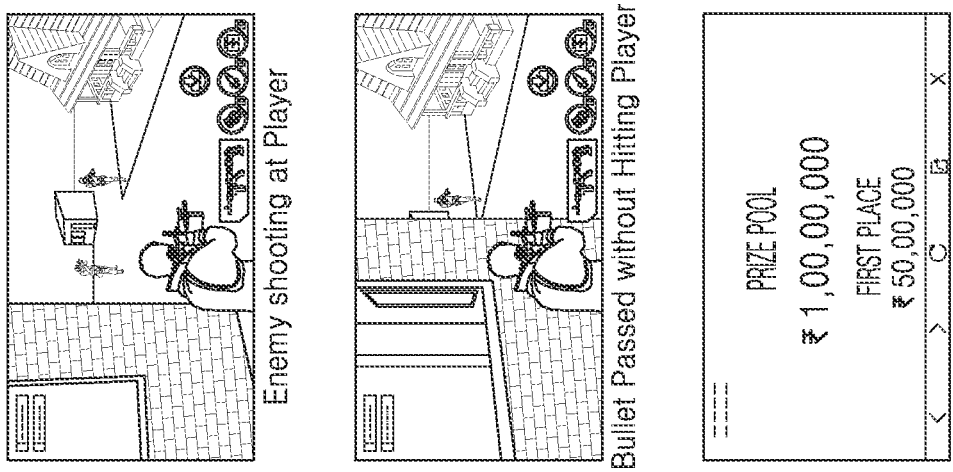
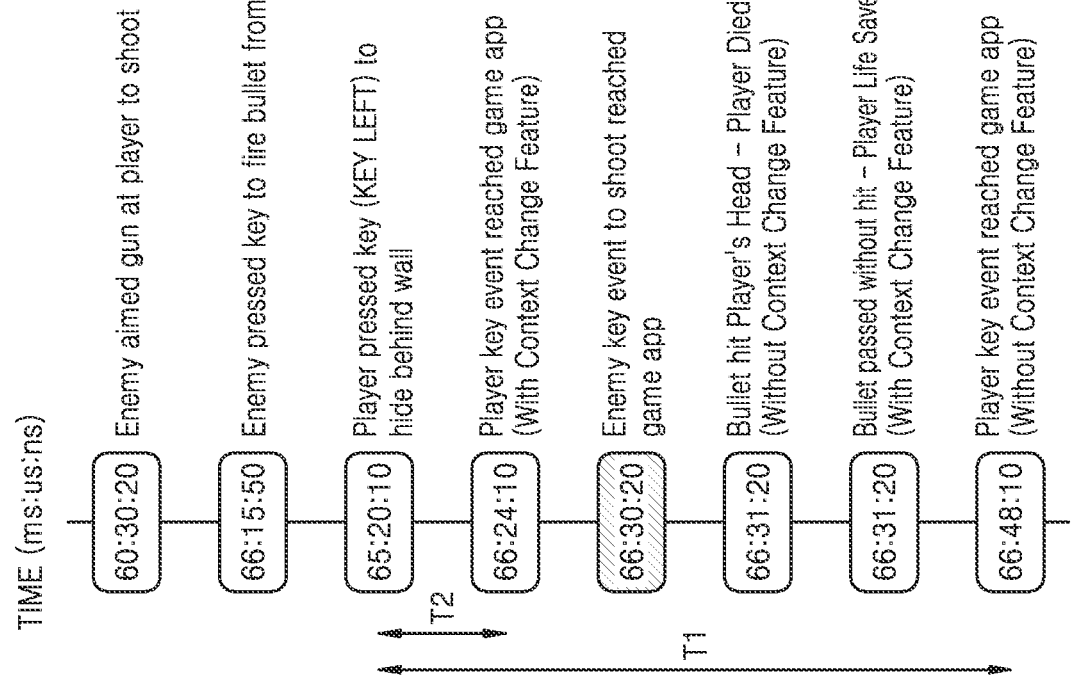
FIG. 9A

FIG. 10A

① 
```
gts71:/#top | grep 800%cpu
800%cpu   4%user   0%nice   61%sys  730%idle   0%iow   2%irq   4%sirq   0%host
 29709 root         20    0  2.0G  3.0M  2.3M S  0.0     0.0    0.00.04   grep 800%cpu
800%cpu   3%user   0%nice   31%sys  761%idle   0%iow   3%irq   1%sirq   0%host
800%cpu   1%user   0%nice   23%sys  772%idle   0%iow   2%irq   1%sirq   0%host
800%cpu   2%user   1%nice   26%sys  767%idle   0%iow   2%irq   1%sirq   0%host
800%cpu   4%user   1%nice   31%sys  759%idle   0%iow   3%irq   2%sirq   0%host
```
CPU Available: ~757% ‖ CPU Usage: ~43%

② 
```
gts71:/#top | grep 800%cpu
800%cpu  34%user   4%nice  220%sys  534%idle   0%iow   6%irq   2%sirq   0%host
 32661 root         20    0  2.0G  3.1M  2.3M S  0.0     0.0    0.00.04   grep 800%cpu
800%cpu  42%user   3%nice  162%sys  583%idle   0%iow   7%irq   4%sirq   0%host
800%cpu  41%user   3%nice  159%sys  586%idle   0%iow   7%irq   4%sirq   0%host
800%cpu  49%user   6%nice  170%sys  563%idle   0%iow   8%irq   4%sirq   0%host
800%cpu  43%user   3%nice  164%sys  579%idle   0%iow   7%irq   4%sirq   0%host
```
CPU Available: ~569% ‖ CPU Usage: ~231%

③ 
```
gts71:/#top | grep 800%cpu
800%cpu  48%user   4%nice  174%sys  564%idle   0%iow   6%irq   4%sirq   0%host
  5037 root         20    0  2.0G  3.1M  2.3M S  0.0     0.0    0.00.03   grep 800%cpu
800%cpu  51%user   4%nice  157%sys  577%idle   0%iow   7%irq   4%sirq   0%host
800%cpu  45%user   3%nice  160%sys  581%idle   0%iow   7%irq   4%sirq   0%host
800%cpu  49%user   6%nice  168%sys  566%idle   0%iow   8%irq   4%sirq   0%host
800%cpu  53%user   3%nice  150%sys  583%idle   0%iow   7%irq   4%sirq   0%host
```
CPU Available: ~574% ‖ CPU Usage: ~226%

FIG. 10B

```
④ gts71:/#top | grep 800%cpu
  800%cpu  2%user  0%nice  79%sys  713%idle   0%iow  4%irq  2%sirq  0%host
   13124 root        20    0  2.0G 30M 2.3M S  0.0    0.0   0.00.04  grep 800%cpu
  800%cpu  3%user  1%nice  29%sys  762%idle   0%iow  3%irq  2%sirq  0%host
  800%cpu  6%user  0%nice  38%sys  751%idle   0%iow  3%irq  2%sirq  0%host
  800%cpu  3%user  1%nice  32%sys  761%idle   0%iow  3%irq  1%sirq  0%host
  800%cpu  3%user  0%nice  32%sys  759%idle   0%iow  3%irq  2%sirq  0%host
  800%cpu  5%user  0%nice  38%sys  751%idle   0%iow  3%irq  2%sirq  0%host
  800%cpu  3%user  1%nice  33%sys  759%idle   0%iow  3%irq  1%sirq  0%host
  gts71:/#
```
CPU Available: ~750% || CPU Usage: ~50%
(713+762+751+761+759+751+759)/7=750)

```
⑤ gts71:/#top | grep 800%cpu
  800%cpu  2%user  0%nice  62%sys  730%idle   0%iow  4%irq  2%sirq  0%host
   22874 root        20    0  2.0G 31M 2.4M S  0.0    0.0   0.00.04  grep 800%cpu
  800%cpu  4%user  0%nice  29%sys  763%idle   0%iow  4%irq  1%sirq  0%host
  800%cpu  2%user  0%nice  32%sys  761%idle   0%iow  4%irq  2%sirq  0%host
  800%cpu  4%user  1%nice  33%sys  757%idle   0%iow  4%irq  1%sirq  0%host
  800%cpu  3%user  0%nice  29%sys  764%idle   0%iow  3%irq  1%sirq  0%host
```
CPU Available: ~754% || CPU Usage: ~52%
(730+763+761+757+764)/5=754

```
⑥ gts71:/#top | grep 800%cpu
  800%cpu  2%user  0%nice  79%sys  713%idle   0%iow  4%irq  2%sirq  0%host
   13124 root        20    0  2.0G 30M 2.3M S  0.0    0.0   0.00.04  grep 800%cpu
  800%cpu  3%user  1%nice  29%sys  762%idle   0%iow  3%irq  2%sirq  0%host
  800%cpu  6%user  0%nice  38%sys  751%idle   0%iow  3%irq  2%sirq  0%host
  800%cpu  3%user  1%nice  32%sys  761%idle   0%iow  3%irq  1%sirq  0%host
  800%cpu  3%user  0%nice  32%sys  759%idle   0%iow  3%irq  2%sirq  0%host
  800%cpu  5%user  0%nice  38%sys  751%idle   0%iow  3%irq  2%sirq  0%host
  800%cpu  3%user  1%nice  33%sys  759%idle   0%iow  3%irq  1%sirq  0%host
  gts71:/#
```
CPU Available: ~750% || CPU Usage: ~50%
(713+762+751+761+759+751+759)/7=750)

```
⑦ gts71:/#top | grep 800%cpu
  800%cpu  6%user  0%nice  88%sys  702%idle   0%iow  2%irq  2%sirq  0%host
  JTasks:  736  total,   1 running,  735 Sleeping,   0 stopped, 0 zombiecpu
  800%cpu  2%user  1%nice  34%sys  758%idle   0%iow  3%irq  2%sirq  0%host
  800%cpu  5%user  0%nice  40%sys  748%idle   0%iow  4%irq  2%sirq  0%host
  800%cpu  3%user  1%nice  31%sys  761%idle   0%iow  3%irq  2%sirq  0%host
  800%cpu  3%user  2%nice  33%sys  757%idle   0%iow  3%irq  2%sirq  0%host
  800%cpu  5%user  1%nice  32%sys  757%idle   0%iow  3%irq  2%sirq  0%host
  800%cpu  4%user  1%nice  36%sys  754%idle   0%iow  3%irq  2%sirq  0%host
  gts71:/#
```
CPU Available: ~748% || CPU Usage: ~52%
(702+758+748+761+757+757+754)/7=748)

METHOD AND ELECTRONIC DEVICE FOR COMMUNICATION ON SINGLE WIRE INTERFACE PRELIMINARY CLASS

CROSS-REFERENCE TO RELATED APPLICATIONS

This application is a by-pass continuation application of International Application No. PCT/KR2023/001059, filed on Jan. 20, 2023, which based on and claims priority to Indian Patent Application No. 202241003263, filed on Jan. 20, 2022, in the Indian Intellectual Property Office, the disclosures of which are incorporated by reference herein in their entireties.

BACKGROUND

1. Field

The present disclosure relates to communication between devices and more specifically related to a method and an electronic device for communication on a single wire interface using interrupts and based on a context.

2. Description of Related Art

In general, 1-Wire® technology is a serial protocol using a single data line with a ground reference for communication. A 1-Wire master (e.g., electronic device in FIG. 1A) initiates and controls the communication with one or more 1-Wire slave devices (e.g., peripheral device in FIG. 1A) on a 1-Wire bus (as shown in FIG. 1A). Each 1-Wire slave device has a unique, unalterable, factory-programmed, 64-bit identification number (ID), which serves as device address on the 1-Wire bus. A 8-bit family code, a subset of the 64-bit ID, identifies a device type and functionality.

In conventional methods and systems, communication between a peripheral device (e.g., a keyboard) and a host device (e.g., a Tablet) connected through the 1-Wire Communication happens by sending and receiving data in form of bits signals (0s and 1s). Generally, for appropriately sending and receiving the data using the 1-Wire Protocol, the peripheral device has a dedicated Microcontroller Unit (MCU) to transfer the data bits and a dedicated MCU is required in the Host device for receiving the data bits in a timely manner (as shown in FIG. 1B). For example, a Key A of a Keyboard is sent in the binary form of bit numbers (01001000). Conventional 1-wire communication is not feasible by connecting the MCU of the peripheral device directly to a Host Application Processor of the host device as there can be scenarios of the data being missed which is not acceptable. Further, the host application processor cannot be used to read the data from the peripheral device at a fast rate because the host application processor handles other tasks such as executing other high priority task at the same time when some data needs to be read from the peripheral device. Therefore, when the host application processor reads the data from the peripheral device after completing the high priority task, a new data is already sent by the peripheral device because of which a previous data is not read and the data is missed by the host device.

Also, the conventional 1-wire communication is a polling based method where the MCU of the peripheral device reduces a data transmission rate so that the host application processor gets sufficient time to complete the high priority tasks and then complete reading every data bit from the peripheral device at the same time. As a result, the time consumption for the 1-wire communication is also higher. In order to reduce the time consumption of the 1-wire communication, conventionally requires an extra MCU in the host device which increases the cost of the host device with extra hardware space being occupied by the extra MCU, which is already limited in the Printed Circuit Board (PCB).

Another problem associated with the 1-wire communication protocol is that an input latency does not change with change in context, irrespective of a user context and application demand. For example, in Gaming, arrow keys are used frequently but a transmission time of the arrow keys to a game application is same as other keys like KEY A, KEY B, etc. As the demand of the arrow keys is greater than other keys, the data of the arrow keys needs to be transmitted more quickly than other keys to get better gaming experience. Thus, it is desired to address the above mentioned disadvantages or other shortcomings or at least provide a useful alternative.

An embodiment herein may provide a method and an electronic device for communication on a single wire interface using interrupts as data in terms of interrupt count and time difference between each interrupt. The proposed method can transfer data between a peripheral device and a host device over the single wire using existing host application processor without the needs for an extra MCU. Also, the proposed method allows data transmission latency to be changed based on user context to enhance experience of certain applications like Gaming, Calculator, Messaging, etc. Therefore, the proposed method is cost effective, saves space on a PCB and also enhances user experience by reducing data transmission latency.

SUMMARY

Provided are a first electronic device and a second electronic device communicating with the first electronic device on a single wire interface and methods thereof. According to an aspect of the embodiment of the present disclosure, a method performed by the first electronic device includes receiving, from the second electronic device, interrupt signals related with a frequency and a time space, over the single wire interface; decoding an input data associated with the interrupt signals based on an interrupt protocol table; and providing the decoded input data to an application on the first electronic device.

According to an aspect of the embodiment of the present disclosure, a method performed by a second electronic device includes: transforming an input data into interrupt signals related with a frequency and a time space using an interrupt protocol table, and transmitting the interrupt signals to the first electronic device on the single wire interface.

According to an aspect of the embodiment of the present disclosure, a first electronic device for communication with a second electronic device on a single wire interface, includes a memory; and a processor executing an application stored in the memory, the processor being configured to: receive, from the second electronic device, interrupt signals related with a frequency and a time space, over the single wire interface; decode an input data associated with the interrupt signals based on an interrupt protocol table; and provide the decoded input data to the application on the first electronic device.

According to an aspect of the embodiment of the present disclosure, a second electronic device for communication with a first electronic device on a single wire interface, the second electronic device including a processor configured to: transform an input data into interrupt signals related with a frequency and a time space using an interrupt protocol table, and transmit the interrupt signals to the first electronic device on the single wire interface.

According to an aspect of the embodiment of the present disclosure, a method performed by a computer system including a first electronic device and a second electronic device communicating with the first electronic device on a single wire interface, includes: at the second electronic device, transforming an input data into interrupt signals related with a frequency and a time space using a first interrupt protocol table; and transmitting the interrupt signals to the first electronic device on the single wire interface, at the first electronic device, receiving, from the second electronic device, the interrupt signals over the single wire interface; decoding the input data associated with the interrupt signals based on a second interrupt protocol table; and providing the decoded input data to an application on the first electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

FIG. 3J illustrates modification of the interrupt protocol table based on the context of the application, according to an embodiment as disclosed herein.

FIG. 4F illustrates an interrupt form data de-transformer of the host device, according to an embodiment as disclosed herein.

FIG. 4H illustrates an interrupt protocol modifier—H of the host device, according to an embodiment as disclosed herein.

FIG. 4I illustrates an interrupt protocol modifier—H of the host device, according to an embodiment as disclosed herein.

FIG. 6A illustrates generation of the interrupt protocol table, according to an embodiment as disclosed herein.

FIG. 6B is an example illustrating the generation of the interrupt protocol table in various scenarios, according to an embodiment as disclosed herein.

FIG. 9A is an example illustrating increased efficiency due to the introduction of the context aware engine for enhancing gaming experience, according to an embodiment as disclosed herein.

FIG. 10A illustrates measurement of main CPU load, according to an embodiment as disclosed herein.

FIG. 10B illustrates measurement of main CPU load, according to an embodiment as disclosed herein.

DETAILED DESCRIPTION

Figure 1A:
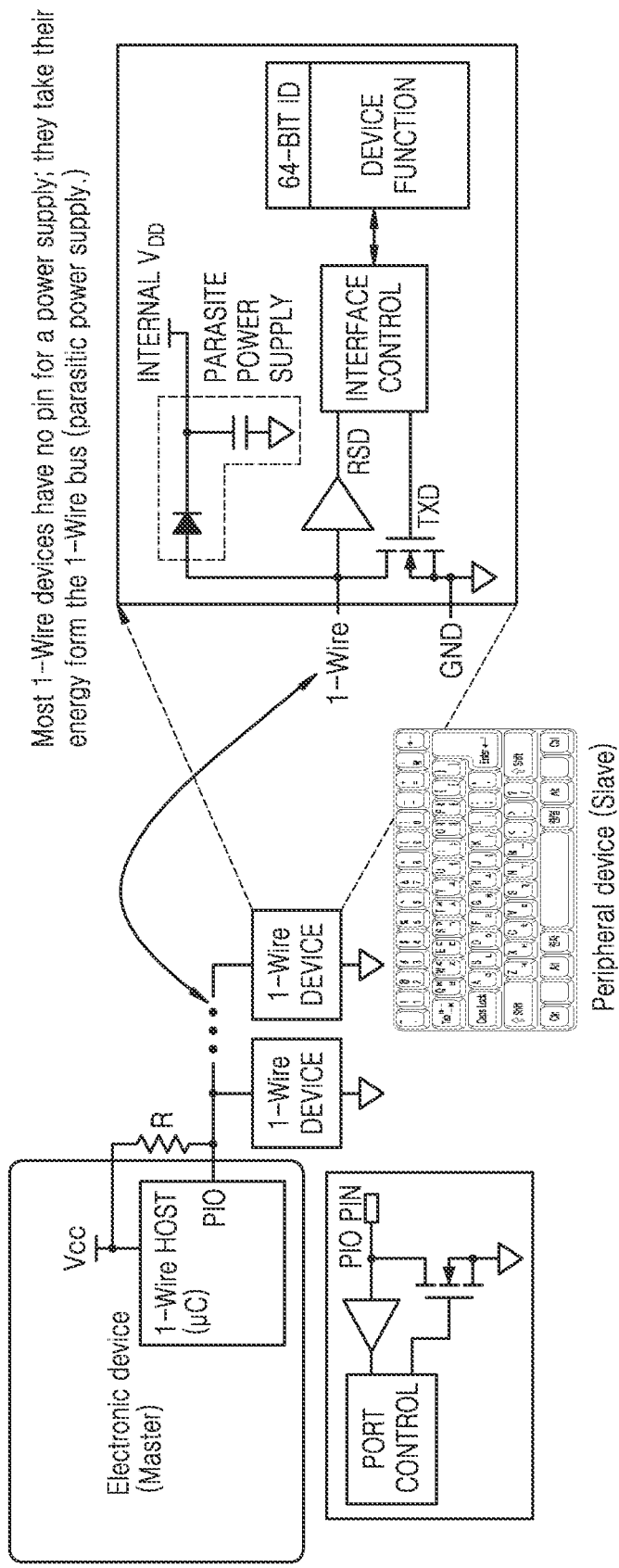
FIG. 1A illustrates communication between a 1-Wire master and 1-Wire slave devices, according to related art.
Figure 1B:
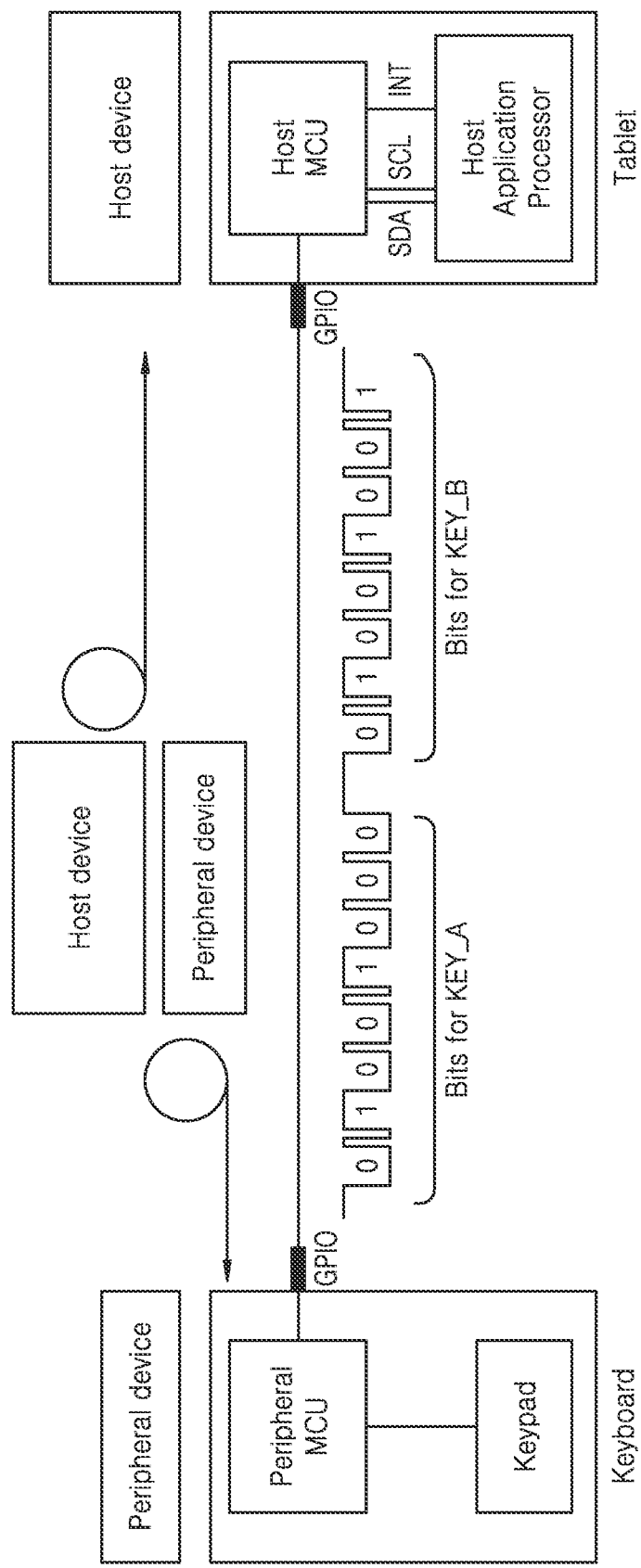
FIG. 1B illustrates bits used in single wire (1-Wire) communication between a peripheral device and a host device, according to related art.

The embodiment herein is to provide a method for communication on a single wire interface by an electronic device. The method includes receiving, by the electronic device, interrupt signals related with a frequency and a time space, over the single wire interface and decoding, by the electronic device, an input data associated with the interrupt signals based on an interrupt protocol table. The method also includes providing, by the electronic device, the decoded input data to an application on the electronic device.

In one embodiment, a computer system includes a first electronic device (e.g., a host device) and a second electronic device (e.g., a peripheral device) that are communicating on a single wire interface (e.g., via a single wire). In one embodiment, a method performed by the first electronic device includes receiving interrupt signals related with a frequency and a time space from the second electronic device, and decoding an input data associated with the interrupt signals based on an interrupt protocol table. The method also includes providing the decoded input data to an application on the first electronic device.

Accordingly, the embodiment herein provides the electronic device for communication on a single wire interface. The electronic device includes a memory, a processor, a communicator and a communication controller. The communication controller is configured to receive interrupt signals related with a frequency and a time space, over the single wire interface. The communication controller is also configured to decode an input data associated with the interrupt signals based on an interrupt protocol table; and provide the decoded input data to an application on the electronic device.

In the conventional methods and systems, a single wire interface and a protocol for master-slave serial communication are used in form of bits. Unlike conventional methods and systems, the proposed method the single wire interface and protocol for master-slave communication uses interrupts as data for communication in form of interrupt count and time difference between each interrupt. Further, the proposed method uses a sync pulse to determine start of data transmission to improve speed of transmission.

In the conventional methods and systems, the master-slave connection pin is configured as a General Purpose Input Output (GPIO) pin for communication. Unlike conventional methods and systems, in the proposed method the master-slave connection pin is configured as an Interrupt pin for communication.

Unlike conventional methods and systems, the proposed method does not require extra Microcontroller Unit (MCU) in master device. It uses an existing interrupt controller and an engine to read the data. Therefore, the proposed method is cost effective and saves space in the PCB.

Unlike conventional methods and systems, the proposed method interprets the input data in the new form of interrupt count and time difference between each interrupt. For example, 'A' is represented as 5 interrupts with time difference of 2 us.

The proposed method generates different quantity of interrupts with defined time difference between each interrupt for each input data and does not use bit concept. The interrupt mechanism is used in both the master and the slave device to send/receive data.

Unlike conventional methods and systems, the proposed method takes comparatively less transmission time and allows the changing of the data transmission speed based on context.

Referring now to the drawings and more particularly to FIGS. 2A through 11B, where similar reference characters denote corresponding features consistently throughout the figures.

Figure 2A:
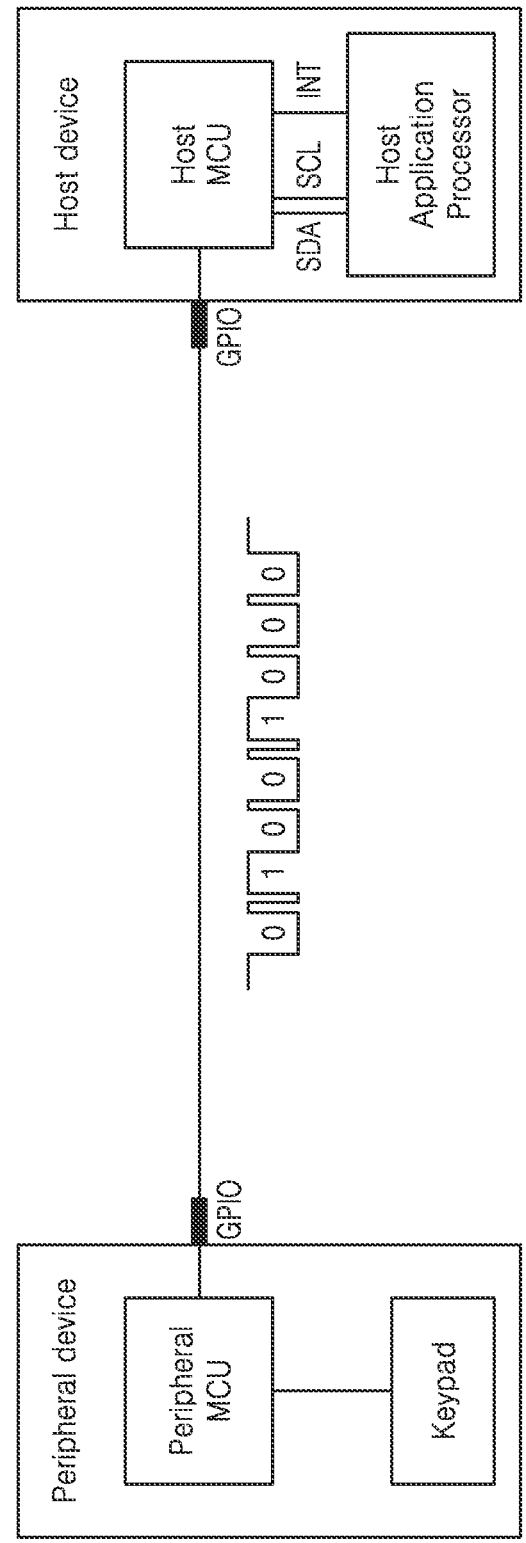
FIG. 2A illustrates communication on the single wire interface, according to the related art.

FIG. 2A illustrates communication on a single wire interface, according to the related art. Consider the conventional single wire communication between a peripheral device (e.g., a keyboard) and a host device (e.g., a Tablet) connected through the 1-Wire interface. The 1-Wire communication is performed by sending and receiving data in form of bits signals (0s and 1s). From the FIG. 2A, the peripheral device includes a peripheral MCU to transfer the data bits to the host device. Similarly, on the host device end, a host MCU is required for receiving the data bits in a timely manner. For example, consider a user inputs Key D of the keyboard and that the binary value of the Key D is 01001000. The peripheral MCU sends the binary value of the Key D to the host MCU. However, the MCU of the peripheral device cannot be connected to a Host Application Processor of the host device to read the data from the peripheral device at a fast rate because the host processor handles other tasks such as executing high priority tasks at the same time when some data needs to be read from the peripheral device. Therefore, when the host application processor reads the data from the peripheral device after completing the high priority task, a new data is already sent by the peripheral device because of which a previous data is not read and the data is missed by the host device. Further, the MCU of the peripheral device reduces a data transmission rate so that the host application processor gets sufficient time to complete the high priority tasks and complete reading every data bit from the peripheral device. The time consumption of the 1-wire communication is generally reduced by introduction of an extra MCU in the host device which increases the cost of the host device with extra hardware space being occupied by the extra MCU, which is already limited in the Printed Circuit Board (PCB).

Figure 2B:
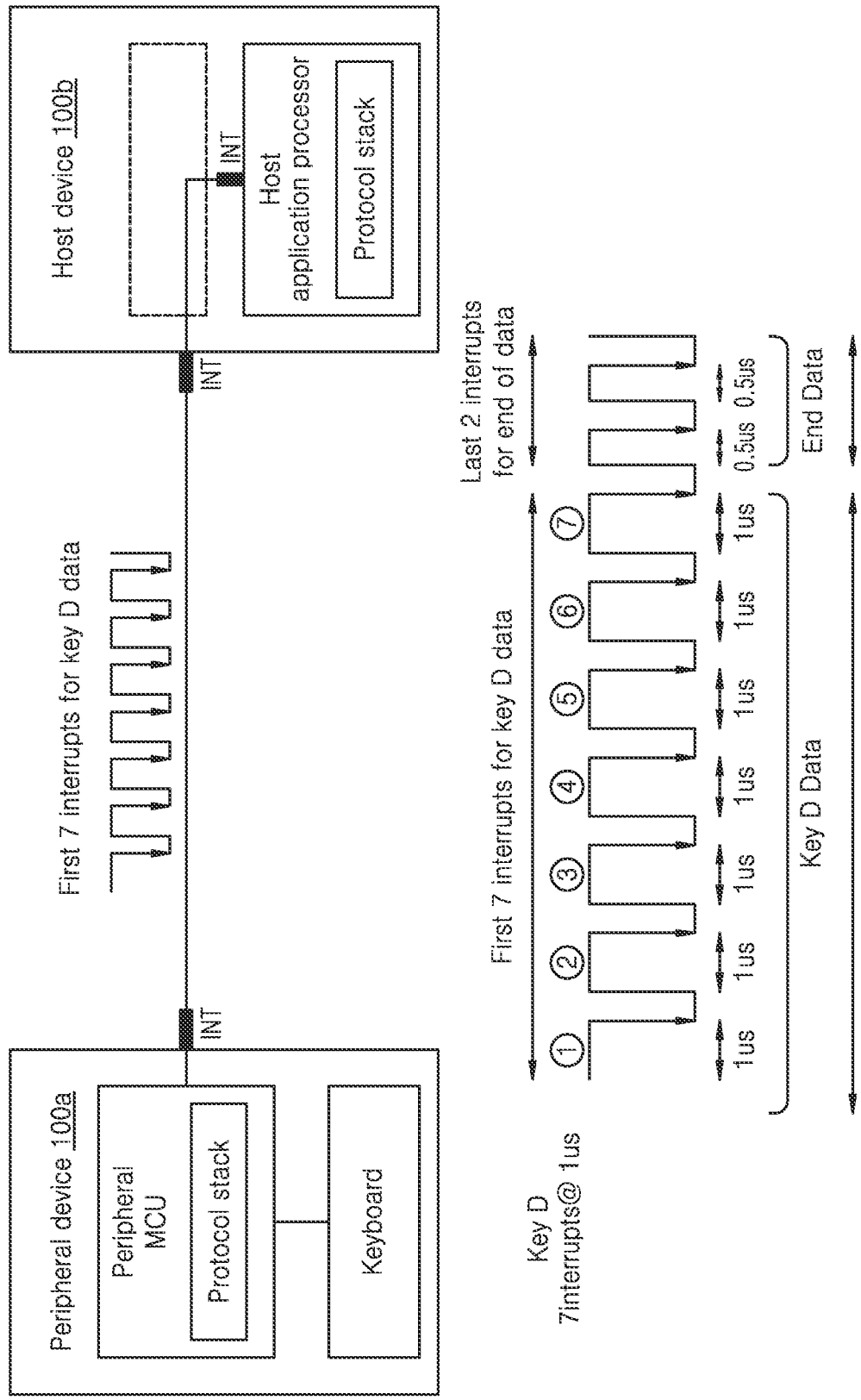
FIG. 2B illustrates communication on the single wire interface, according to an embodiment as disclosed herein.

FIG. 2B illustrates communication on a single wire interface, according to an embodiment as disclosed herein. Referring to the FIG. 2B in conjunction with the FIG. 2A, unlike to the conventional single wire communication, in the proposed method the input data transmission between the peripheral device 100a and the host device 100b takes place in the form of interrupt signals (i.e., impulses). The proposed solution provides a communication protocol stack which receives input data requests and transforms them into interrupts signals data form and sends the interrupt signal data to the host application processor directly. Therefore, there is no MCU at the host device. In the example as in FIG. 2B, the key D data is converted into seven interrupts with a time difference of 1 microsecond rather sending the key D data as bits, as shown in FIG. 2A. Examples of the interrupt count for various keys in the peripheral device are provided in table. 1.

TABLE 1

| Key | Interrupt Count | Time difference between interrupts (μs) |
| --- | --- | --- |
| KEY_A | 4 | 1 |
| KEY_B | 5 | 1 |
| KEY_C | 6 | 1 |

TABLE 1-continued

| Key | Interrupt Count | Time difference between interrupts (μs) |
|---|---|---|
| KEY_D | 7 | 1 |
| KEY_E | 3 | 2 |
| EOD | 2 | 0.5 |

In the example, the key D data is sent as 7 interrupt counts with the time difference of 1 μs between each of the interrupts using falling edge interrupts. Further, the end of data is indicated using two interrupt signals with time difference of 0.5 μs between each of the interrupts. Therefore, the total Transmission Time for transmission of the key D data is 8 (1*7+0.5*2=8 μs).

Therefore, the proposed method provides the advantages such as the overall cost is reduced, the space covered on the PCB by the host MCU is saved, fast response for key strokes from the keyboard and scalability to other devices like game pad, joystick, etc.

Figure 2C:
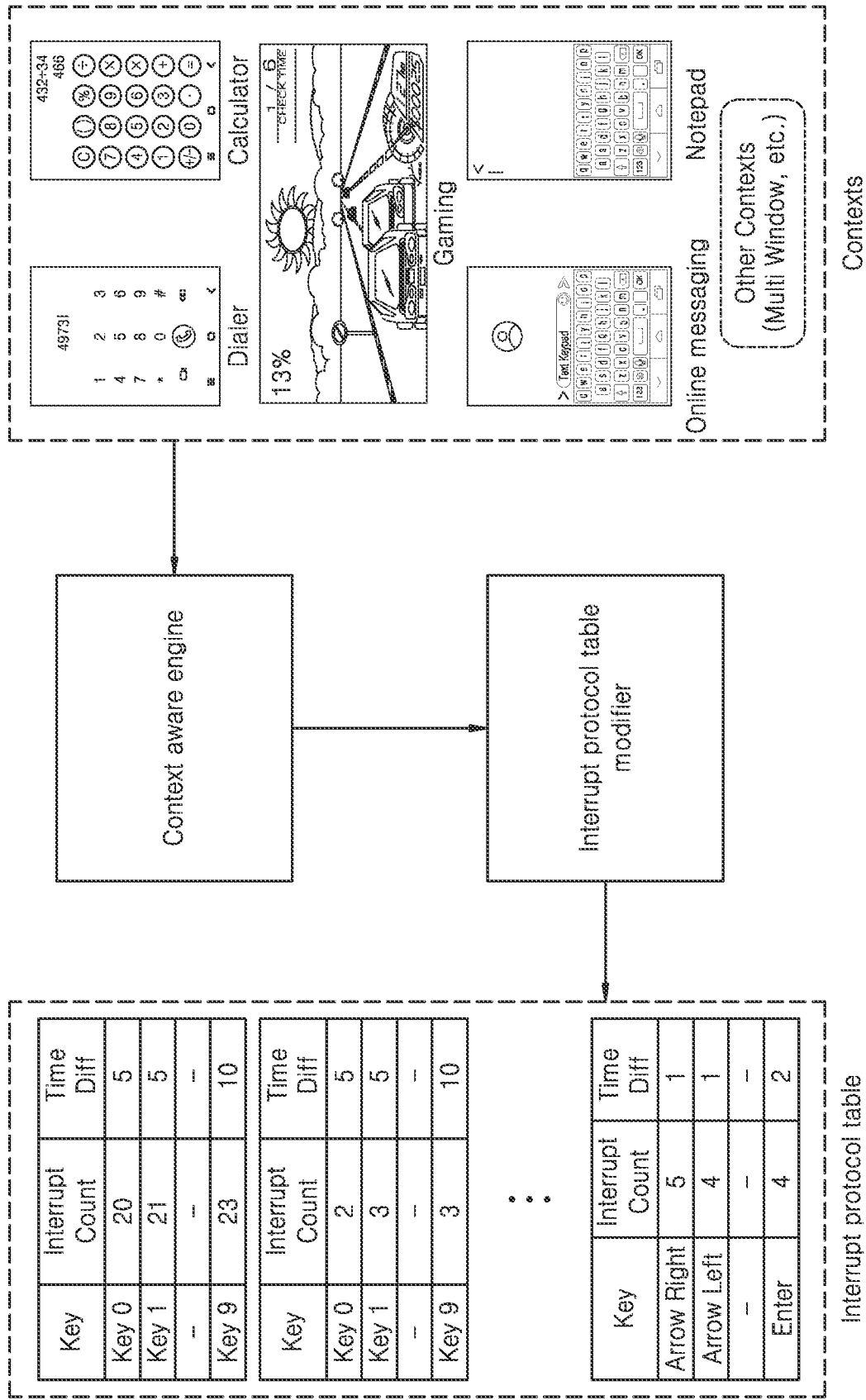
FIG. 2C illustrates communication on the single wire interface based on a context of an application, according to an embodiment as disclosed herein.

FIG. 2C illustrates communication on the single wire interface based on a context of an application, according to an embodiment as disclosed herein. Referring to the FIG. 2C, the proposed method includes changing an input latency for a set of keys based on the context of the application. The context of the application is identified and at run time the interrupt count and time difference between interrupts for a set of keys which are used frequently by the particular context is changed to lower the latency for the set of keys and enhance user experience. For example, if the context is related to gaming then the arrow keys are frequently used in gaming and hence the interrupt count and time difference between the interrupts for the arrow keys is changed to provide better gaming experience. In another example, consider the user frequently uses calculator for performing various calculations, then the context is related to calculations. Therefore, the number keys are frequently used and hence, the interrupt count and time difference between the interrupts for the number keys is changed to provide better calculating experience. Similarly, each different application has a different context and based on the context corresponding frequently used keys also differ. Hence, in the proposed method, the interrupt count and time difference between the interrupts for corresponding frequently used keys are changed accordingly based on the context determined based on user behavior.

Figure 3A:
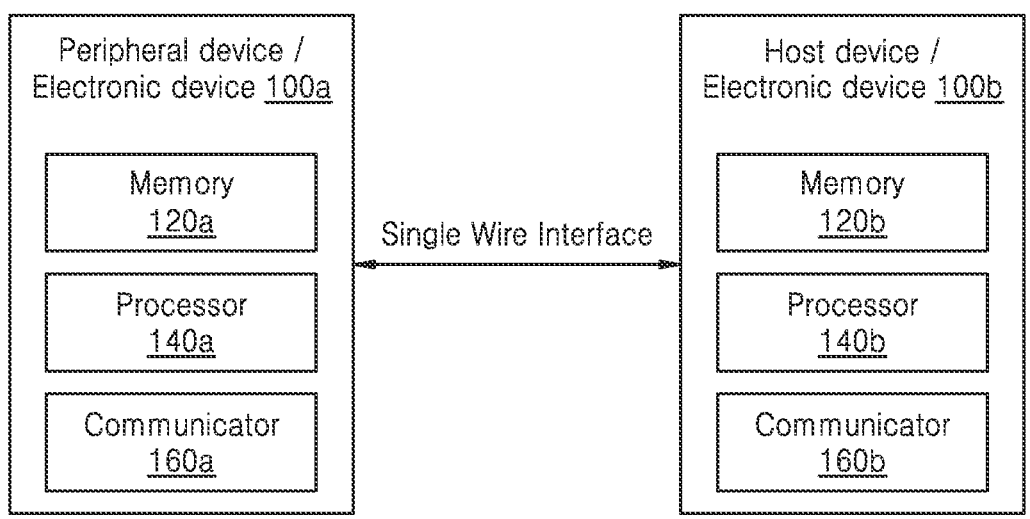
FIG. 3A illustrates block diagram of a peripheral device and a host device communicating on the single wire interface, according to an embodiment as disclosed herein.

FIG. 3A illustrates a block diagram of the peripheral device 100a and the host device 100b communicating on the single wire interface, according to an embodiment as disclosed herein. The peripheral device 100a can be for example, but not limited to a tablet keyboard, temperature sensor, read-only-memory (ROM) and battery fuel gauge, etc. The host device 100b can be for example, but not limited to a laptop, a palmtop, a desktop, a mobile phone, a smart phone, a television (TV), Personal Digital Assistant (PDA), a tablet, a wearable device, an Internet of Things (IoT) device, a virtual reality device, a foldable device, a flexible device and an immersive system. It is to be noted that the peripheral device 100a may be for example embedded in the host device 100b. In another embodiment, the peripheral device 100a may be located outside the host device 100b and communicating over the single wire interface.

In an embodiment, the peripheral device 100a includes a memory 120a, a processor 140a, and a communicator 160a. The memory 120a is configured to store instructions to be executed by the processor 140a. The memory 120a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120a may, in some examples, be considered a non-transitory storage medium. The term "non-transitory" may indicate that the storage medium is not embodied in a carrier wave or a propagated signal. However, the term "non-transitory" should not be interpreted that the memory 120a is non-movable. In some examples, the memory 120a can be configured to store larger amounts of information. In certain examples, a non-transitory storage medium may store data that can, over time, change (e.g., in Random Access Memory (RAM) or cache).

The processor 140a communicates with the memory 120a and the communicator 160a. The processor 140a is configured to execute instructions stored in the memory 120a and to perform various processes. The processor 140a may include one or a plurality of processors, may be a general purpose processor, such as a central processing unit (CPU), an application processor (AP), or the like, a graphics-only processing unit such as a graphics processing unit (GPU), a visual processing unit (VPU), an Artificial intelligence (AI) dedicated processor such as a neural processing unit (NPU), and/or a micro processing unit (MCU). The processor 140a may correspond to the peripheral MCU in FIG. 2B.

In an embodiment, the processor 140a transforms an input data into interrupt signals related with a frequency and a time space using an interrupt protocol table.

In an embodiment, the processor 140a transmits the interrupt signals to the hose device 100b on the single wire interface.

The communicator 160a includes an electronic circuit specific to a standard that enables wired or wireless communication. The communicator 160a is configured to communicate internally between internal hardware components of the peripheral device 100a and with external devices via one or more networks.

In an embodiment, the host device 100b includes a memory 120b, a processor 140b and a communicator 160b. The memory 120b is configured to store instructions to be executed by the processor 140b. The memory 120b may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120b may, in some examples, be considered a non-transitory storage medium. The term "non-transitory" may indicate that the storage medium is not embodied in a carrier wave or a propagated signal. However, the term "non-transitory" should not be interpreted that the memory 120b is non-movable. In some examples, the memory 120b can be configured to store larger amounts of information. In certain examples, a non-transitory storage medium may store data that can, over time, change (e.g., in Random Access Memory (RAM) or cache).

The processor 140b communicates with the memory 120b, the communicator 160b and the communication management controller 180b. The processor 140b is configured to execute instructions stored in the memory 120b and to perform various processes. The processor 140b is configured to execute an application stored in the memory 120b. The processor may include one or a plurality of processors, may be a general purpose processor, such as a central processing unit (CPU), an application processor (AP), or the like, a graphics-only processing unit such as a graphics processing unit (GPU), a visual processing unit (VPU), an Artificial intelligence (AI) dedicated processor such as a neural processing unit (NPU), and/or a micro processing unit (MCU). The processor 140b may correspond to the host application processor in FIG. 2B.

In an embodiment, the processor 140b receives, from the peripheral device 100a, interrupt signals related with a frequency and a time space, over the single wire interface.

In an embodiment, the processor 140b decodes an input data associated with the interrupt signals based on an interrupt protocol table.

In an embodiment, the processor 140b provides the decoded input data to the application on the host device 100b.

The communicator 160b includes an electronic circuit specific to a standard that enables wired or wireless communication. The communicator 160b is configured to communicate internally between internal hardware components of the host device 100b and with external devices via one or more networks.

Although the FIG. 3A shows various components of the peripheral device 100a and the host device 100b but it is to be understood that the embodiment are not limited thereon. In an embodiment, the peripheral device 100a and the host device 100b may include less or more number of components. Further, the labels or names of the components are used only for illustrative purpose and does not limit the scope of the present disclosure. One or more components can be combined together to perform same or substantially similar function.

Figure 3B:
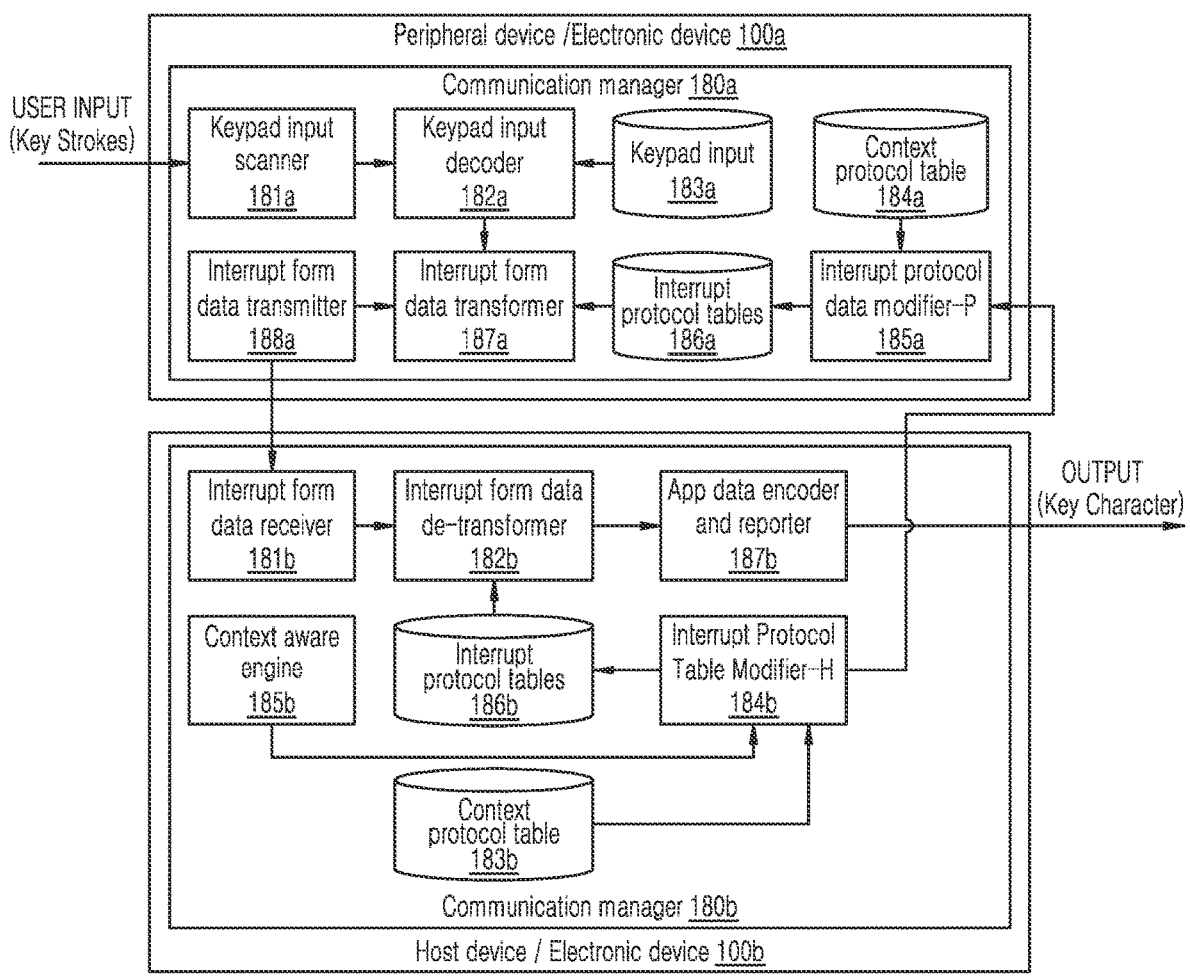
FIG. 3B illustrates a communication process on the single wire interface between the peripheral device and the host device, according to an embodiment as disclosed herein.

FIG. 3B illustrates a communication process on the single wire interface between the peripheral device and the host device, according to an embodiment as disclosed herein. The communication process in FIG. 3B may be performed by the processor 140a and the processor 140b in FIG. 3A.

In an embodiment, the communication manager 180a of the peripheral device 100a includes a keypad input scanner 181a, a keypad input decoder 182a, a keypad input table 183a, a context protocol table 184a, an interrupt protocol table modifier—P 185a; interrupt protocol tables 186a, an interrupt form data transformer 187a and an interrupt form data transmitter 188a. The interrupt protocol table modifier—P 185a is a first interrupt protocol table modifier located in the peripheral device 100a, thus the first interrupt protocol table modifier has the "P" prefix throughout the present disclosure.

In an embodiment, the keypad input scanner 181a is configured to periodically scan an input data register (for example, a key or a button which is used to input data in the peripheral device 100a) updated when the key of the peripheral device 100a is pressed or released. The keypad input scanner 181a detects a change in input data register value and notifies the keypad input decoder 182a. Consider the Keypad of the peripheral device 100a includes key layout as provided in FIG. 3D. For example consider the user keys in "HI" on the peripheral device 100a.

Row:[00000000] Col: [11111111] changed to Row: [00000100] Col:[11101111]→'H' Detected
Row:[00000000] Col:[11111111] changed to Row: [01000000] Col: [11110111]→'I' Detected In an embodiment, the keypad input decoder (182a) is configured to decode the register value to identify values of the key pressed or released on the peripheral device 100a using a Keypad Input Table (as provided in table. 2). Therefore, in the above example the keys pressed are detected as 'H' and 'I'.

TABLE 2

| Row Index | Column Index | Data Bits | Key |
|---|---|---|---|
| 5 | D | 00000100 11101111 | KEY_H |
| 1 | E | 1000000 11110111 | KEY_I |
| 7 | G | 0000001 11111101 | KEY_HOME |
| 7 | E | 0000001 11110111 | KEY_0 |
| 0 | D | 0000000 11101111 | KEY_7 |

In an embodiment, the interrupt form data transformer 187a is configured to transform the input data into the interrupt signals related with the frequency and the time space using the interrupt protocol table. The transformation is done by decoding the input data using an input data mapping table and determining a value associated with the input data. The interrupt signals are a combination of the interrupt count and a first pattern of the time difference between each of the interrupt signals.

In an embodiment, the interrupt form data transmitter 188a is configured to send the interrupt signals related with the frequency and the time space generated by the interrupt form data transformer 187a for the specific key pressed by the user on the keypad. Further, the interrupt form data transmitter 188a also sends a second pattern of the time difference between two consecutive interrupt signals of the interrupt signals to indicate an end of the input data.

In an embodiment, the interrupt protocol table modifier—P 185a is configured to receive a specific pattern of the interrupt count from the host device 100b indicating a context category for an application running on the host device 100b and identify at least one context category for the application. Further, the interrupt protocol table modifier—P 185a is also configured to change the interrupt count and the first pattern of the time difference between each of the at least two interrupt signals for a set of input data and generate the new interrupt protocol table with the changed interrupt count and the first pattern of the time difference between each of the at least two interrupt signals for the set of input data. The one context category for the application can be for example, gaming, messaging, calculation, multi-window, dialer, notepad, etc. where each of the context have specific keys which are frequently used than the other keys in the keypad of the peripheral device 100a. For example, in case of a notepad or messaging context, alphabet keys will be frequently used than numbers or arrow keys. Similarly, for the gaming context, the arrow keys will be used frequently than the alphabets or numbers. Therefore, the context is changed based on the user behavior with respect to an application on the keypad of the peripheral device 100a which may be determined over a period of time.

In an embodiment, the communication manager 180b of the host device 100b includes an interrupt form data receiver 181b, an interrupt form data de-transformer 182b, a context protocol table 183b, an interrupt protocol table modifier—H 184b, a context aware engine 185b, interrupt protocol tables 186b and an application data encoder and reporter 187b. The interrupt protocol table modifier—H 184b is a second interrupt protocol table modifier located in the host device/electronic device 100b, thus the second interrupt protocol table modifier has the "H" prefix throughout the present disclosure.

In an embodiment, the interrupt form data receiver 181*b* is configured to receive the at least two interrupt signals from the peripheral device 100*a*.

In an embodiment, the interrupt form data de-transformer 182*b* is configured to determine the interrupt count, the first pattern of the time difference between each of the at least two interrupt signals and the second pattern of time difference between two consecutive interrupt signals of the at least two interrupt signals and de-transform the interrupt count and the first pattern of the time difference between each of the at least two interrupt signals to the input data based on the interrupt protocol table.

In an embodiment, the context protocol table 183*b* includes context protocol tables which in conjunction with the context aware engine 185*b* identifies the at least one context category for the application.

In an embodiment, the interrupt protocol table modifier—H 184*b* is configured to change the interrupt count and the first pattern of the time difference between each of the at least two interrupt signals for a set of input data and generate the new interrupt protocol table with the changed interrupt count and the first pattern of the time difference between each of the at least two interrupt signals for the set of input data.

In an embodiment, the context aware engine 185*b* is configured to identify the at least one context category for the application and share the same to the interrupt protocol table modifier—H 184*b*.

In an embodiment, the interrupt protocol tables 186*b* include multiple interrupt protocol tables generated by the host device 100*b*. In an embodiment, the application data encoder and reporter 187) are configured to encode the key character into an integer ID and send to the application running on the host device 100*b*.

Although the FIG. 3B shows various components of the peripheral device 100*a* and the host device 100*b* but it is to be understood that the embodiment are not limited thereon. In an embodiment, the peripheral device 100*a* and the host device 100*b* may include less or more number of components. Further, the labels or names of the components are used only for illustrative purpose and does not limit the scope of the present disclosure. One or more components can be combined together to perform same or substantially similar function.

Figure 3C:
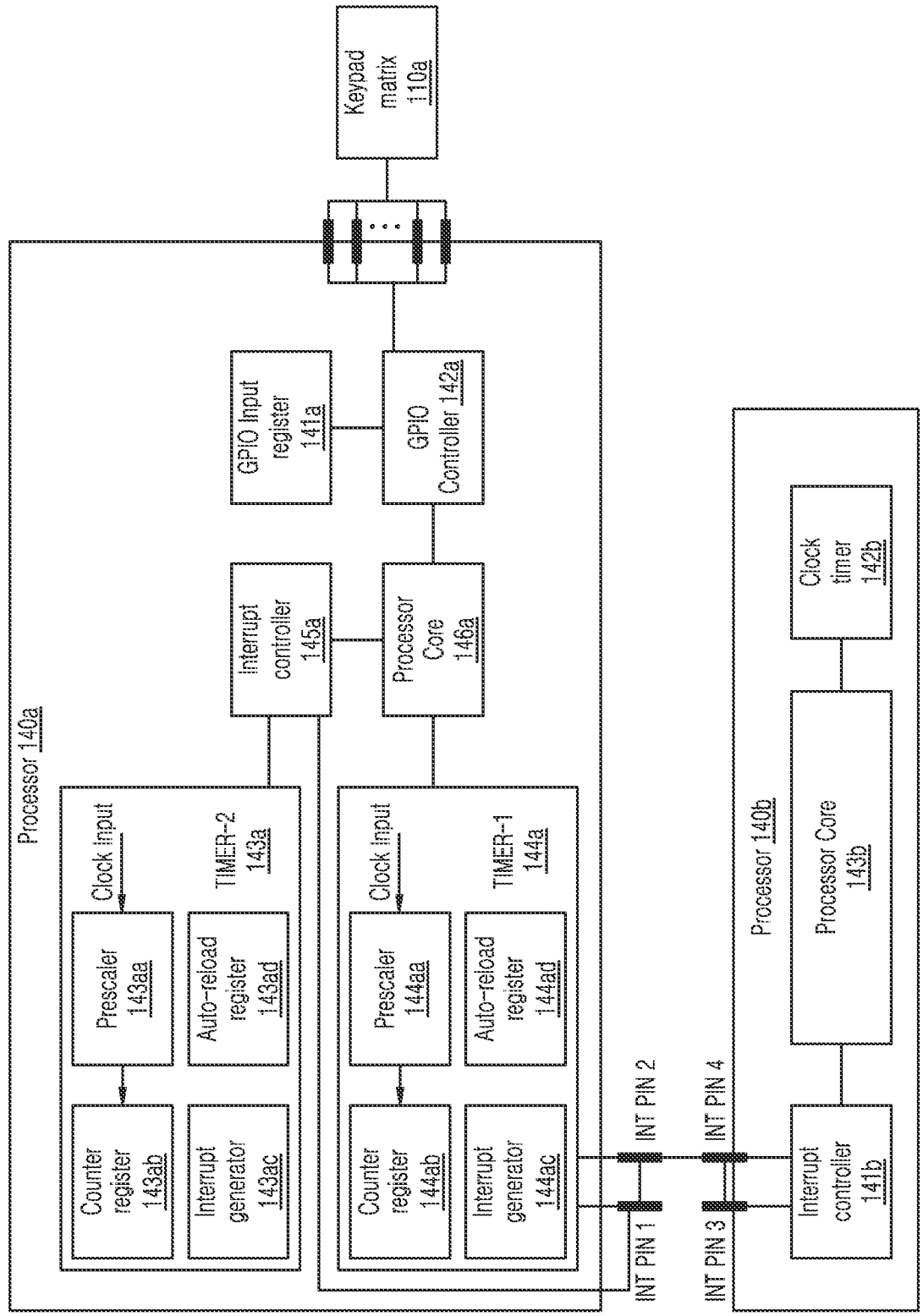
FIG. 3C illustrates multiple hardware components of the peripheral device and the host device involved in communication on the single wire interface, according to an embodiment as disclosed herein.

FIG. 3C illustrates multiple hardware components of the peripheral device 100*a* and the host device 100*b* involved in communication on the single wire interface, according to an embodiment as disclosed herein.

Referring to the FIG. 3C, a keypad matrix 110*a* is directly connected to the processor 140*a* through pins for each keyboard key, to provide the inputs by pressing the keys. The processor 140*a* includes a GPIO input register 141*a*, a GPIO controller 142*a*, an interrupt controller 145*a*, a TIMER-1 144*a* and a TIMER-2 143*a*.

The GPIO input register 141*a* is configured to store keyed in input. The interrupt controller 145*a* is configured to receive interrupts for context change from the host device 100*b* and from the TIMER-2 143*a*. The TIMER-2 143*a* is configured for sending interrupt to itself after total desired quantity of interrupts are sent to the host device 100*b*. The TIMER-1 144*a* is configured for sending interrupts to the host device 100*b* at desired time intervals. The processor core 146*a* executes the protocol stack.

INT PIN 1 and INT PIN 3 are used for context change. INT PIN 2 and INT PIN 4 are used for interrupt data transmission. In the processor 140*b* controls processor core 143*b*, interrupt controller 141*b* and a clock timer 142*b*. The processor core 143*b* and the clock timer 142*b* are configured to executing protocol stack provided in FIG. 3B. The interrupt controller 141*b* is configured to receive interrupts from the peripheral device 100*a* for the data and the context. Therefore, the proposed method eliminates the need for a dedicated MCU.

Figure 3D:
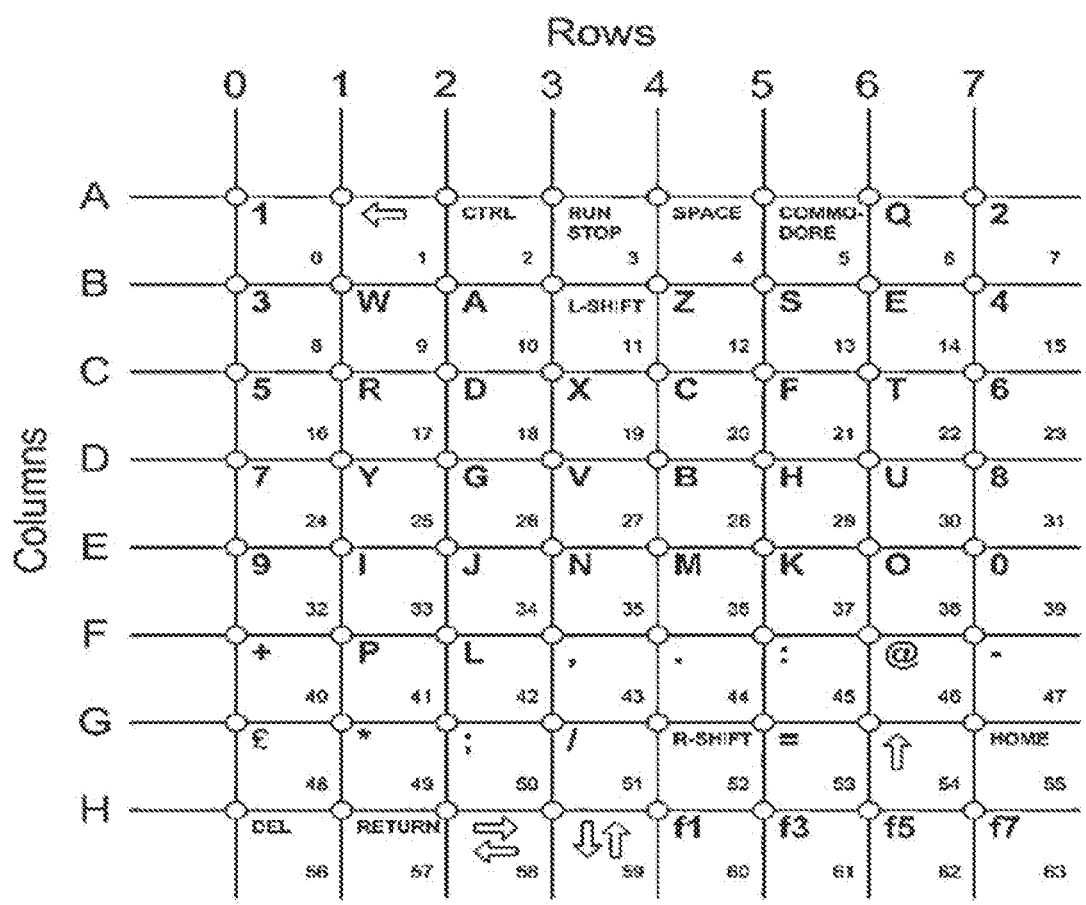
FIG. 3D is a key layout of a keypad of the peripheral device, according to an embodiment as disclosed herein.
Figure 3E:
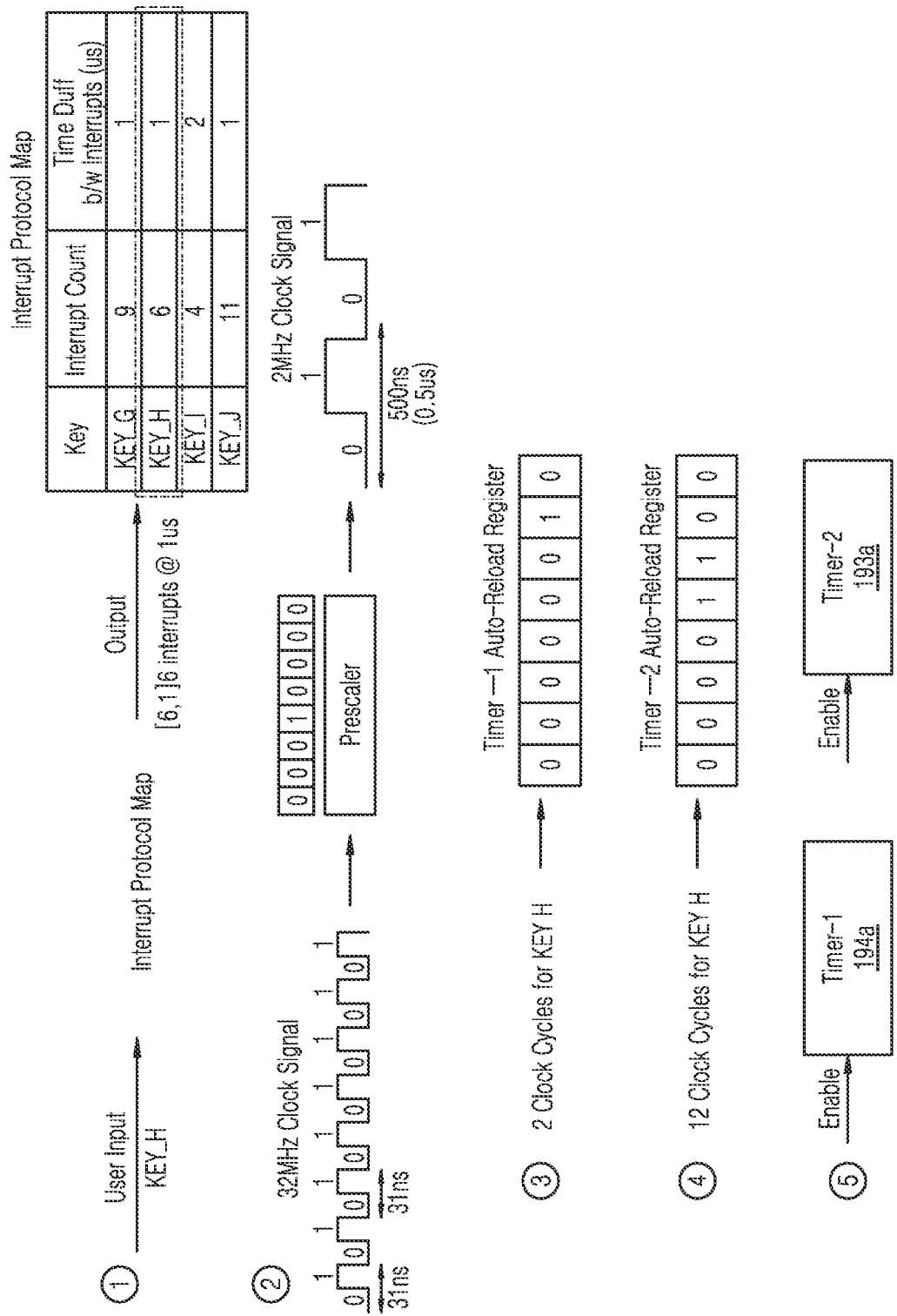
FIG. 3E illustrates the method for transforming an input data into interrupt signals related with a frequency and a time space using an interrupt protocol table, according to an embodiment as disclosed herein.

FIG. 3E illustrates the method for transforming the input data into the interrupt signals related with the frequency and the time space using the interrupt protocol table, according to an embodiment as disclosed herein.

Referring to the FIG. 3E in conjunction with the FIG. 3B and the FIG. 3D, at operation 1, the interrupt form data transformer 187*a* transforms the key or button value of the input keyed in by the user on the keypad into a unique combination of interrupt count and time difference between each interrupt using the Interrupt Protocol Table. The Interrupt Protocol Table includes the unique combination of interrupt count and time difference between each interrupt for each of the keys in the keypad of the peripheral device 100*a*. For example, the 'KEY_H' is transformed into 6 interrupt counts with each interrupt having an interrupt Time Difference of 1 µs.

At operation 2, the interrupt form data transformer 187*a* is configured to set a value of a prescaler (144*aa*) to 16. This will increment a counter register 144*ab* value by 1 for every clock cycle of 32 MHZ processor i.e. 0.5 µs.

At operation 3, the interrupt form data transformer 187*a* is configured to set auto-reload register (144*ad*) of Timer-1 (144*a*) with clock cycle value equivalent to time difference between each interrupt. For example, 1 µs between each interrupt is equivalent to 2 clock cycles of the 32 MHZ processor prescaled by a factor of 16. Therefore, the auto-reload register (144*ad*) value is 00000010 (2 clock cycles).

At operation 4, the interrupt form data transformer 187*a* is configured to the set auto-reload register (143*ad*) of a Timer-2 (143*a*) with clock cycle value equivalent to:

Interrupt count*time difference between each interrupt

In the above example: 6 interrupts*1 µs=6 µs.

This is equivalent to 12 clock cycles.

Therefore, the auto-reload register 143*ad* value is 00001100 (12 clock cycles).

At operation 5, the interrupt form data transformer 187*a* is configured to enable both the Timer-1 144*a* and Timer-2 143*a*. Further, the counter registers value increments by 1 bit for every clock cycle which is after every 0.5 µs for both timers.

Figure 3F:
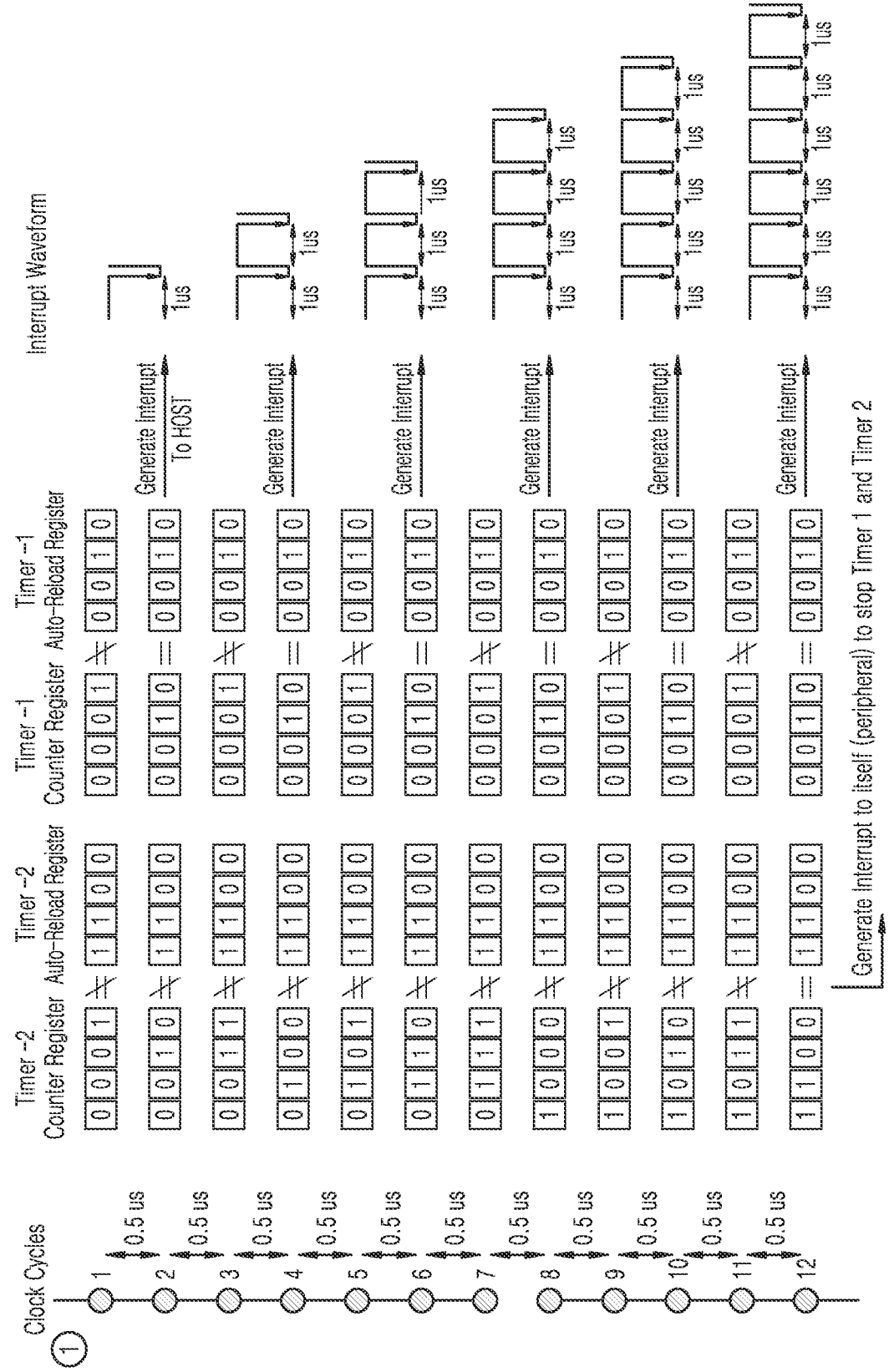
FIG. 3F illustrates a transmission of a transformed interrupt signals related with the frequency and the time space, according to an embodiment as disclosed herein.
Figure 3G:
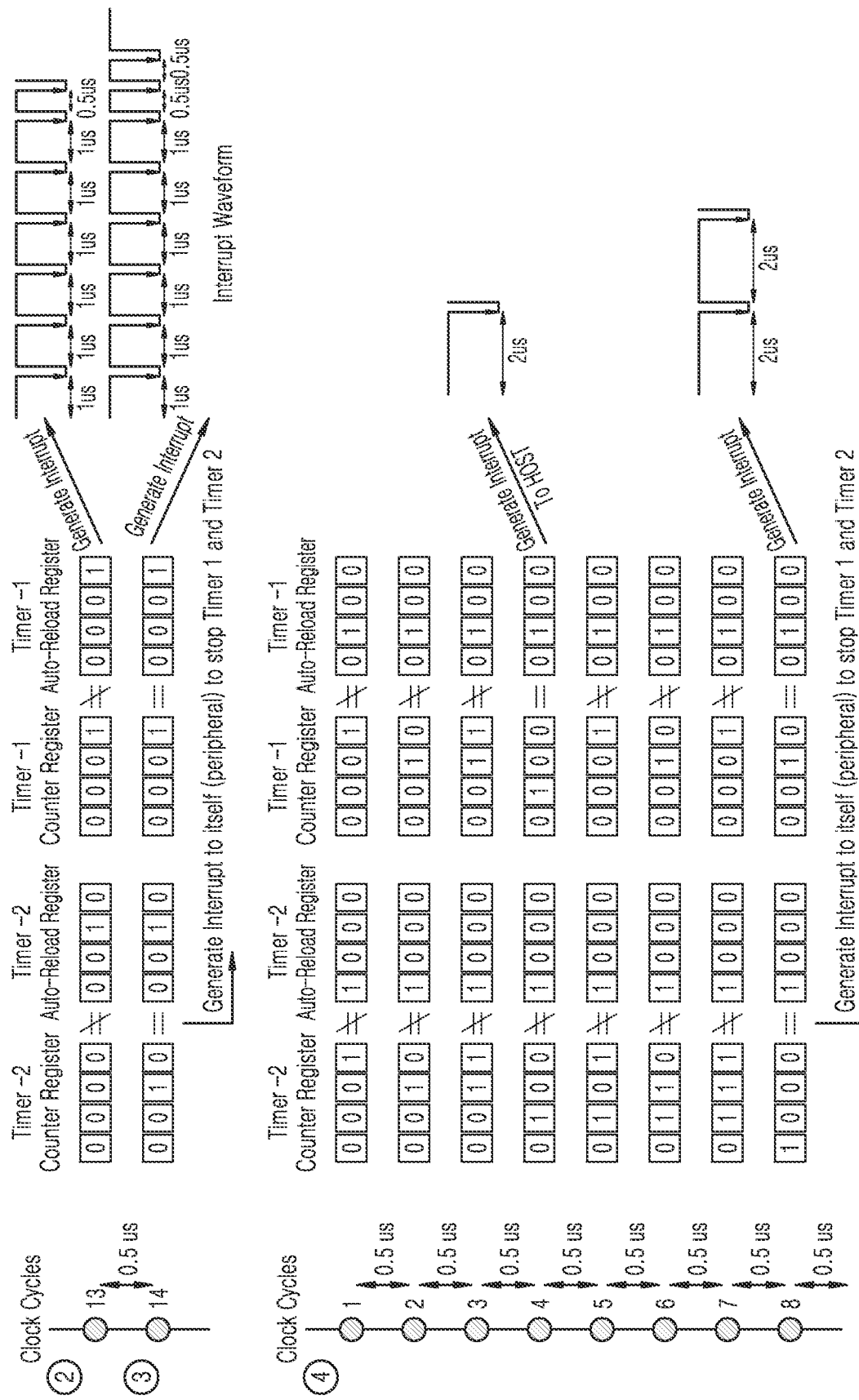
FIG. 3G illustrates a transmission of a transformed interrupt signals related with the frequency and the time space, according to an embodiment as disclosed herein.
Figure 3H:
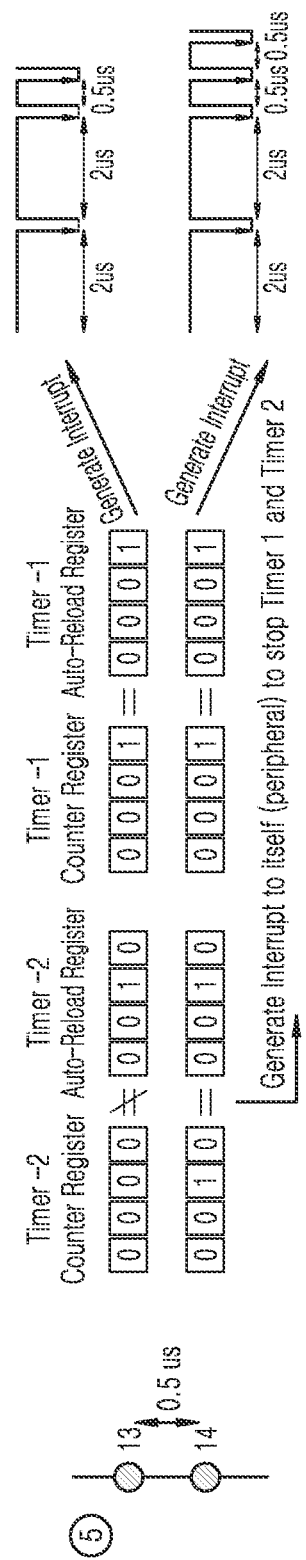
FIG. 3H illustrates a transmission of a transformed interrupt signals related with the frequency and the time space, according to an embodiment as disclosed herein.

FIGS. 3F, 3G and 3H illustrates a transmission of the transformed interrupt signals related with the frequency and the time space, according to an embodiment as disclosed herein.

Referring to the FIGS. 3F, 3G and 3H in conjunction with the FIGS. 3A-3E, at operation 1 the timer-1 144*a* generates the interrupts to the processor 140*b* of the host device 100*b* after the value of the counter register 144*ab* matches the value of the auto-reload register 144*ad*. In the example, the Interrupts generate every 1 µs for the 'KEY_H'. Further, the timer-2 143*a* generates interrupts internally to a Peripheral MCU after the value of the counter register 143*ab* matches the value of the auto-reload register 143*ad*. For example, the interrupt is sent to the Peripheral MCU after 6 µs for the 'KEY_H'.

At operation 2, the MCU of the peripheral device 100*a* receives the interrupt from the Timer-2 143*a* and calls an interrupt handler. The interrupt handler of the Timer-2 143*a* stops both the Timer-1 144*a* and the Timer-2 143*a*. At operation 3, the interrupt form data transmitter 188*a* sends an End of Data (EOD) character for the KEY_H pressed. In the example, an 'EOD' is an interrupt count of 2 with an interrupt Time Difference of 0.5 µs.

At operation 4, the interrupt form data transmitter (188a) sends a release (RL) character on detecting that the user has released the key on the keypad. For example, the 'RL' is an interrupt count of 2 with an interrupt Time Difference of 2 µs. At operation 5, the interrupt form data transmitter 188a sends an End of Data (EOD) character for RELEASE KEY. For example, the 'EOD' is an Interrupt count of 2 with Interrupt Time Difference of 0.5 µs.

Figure 3I:
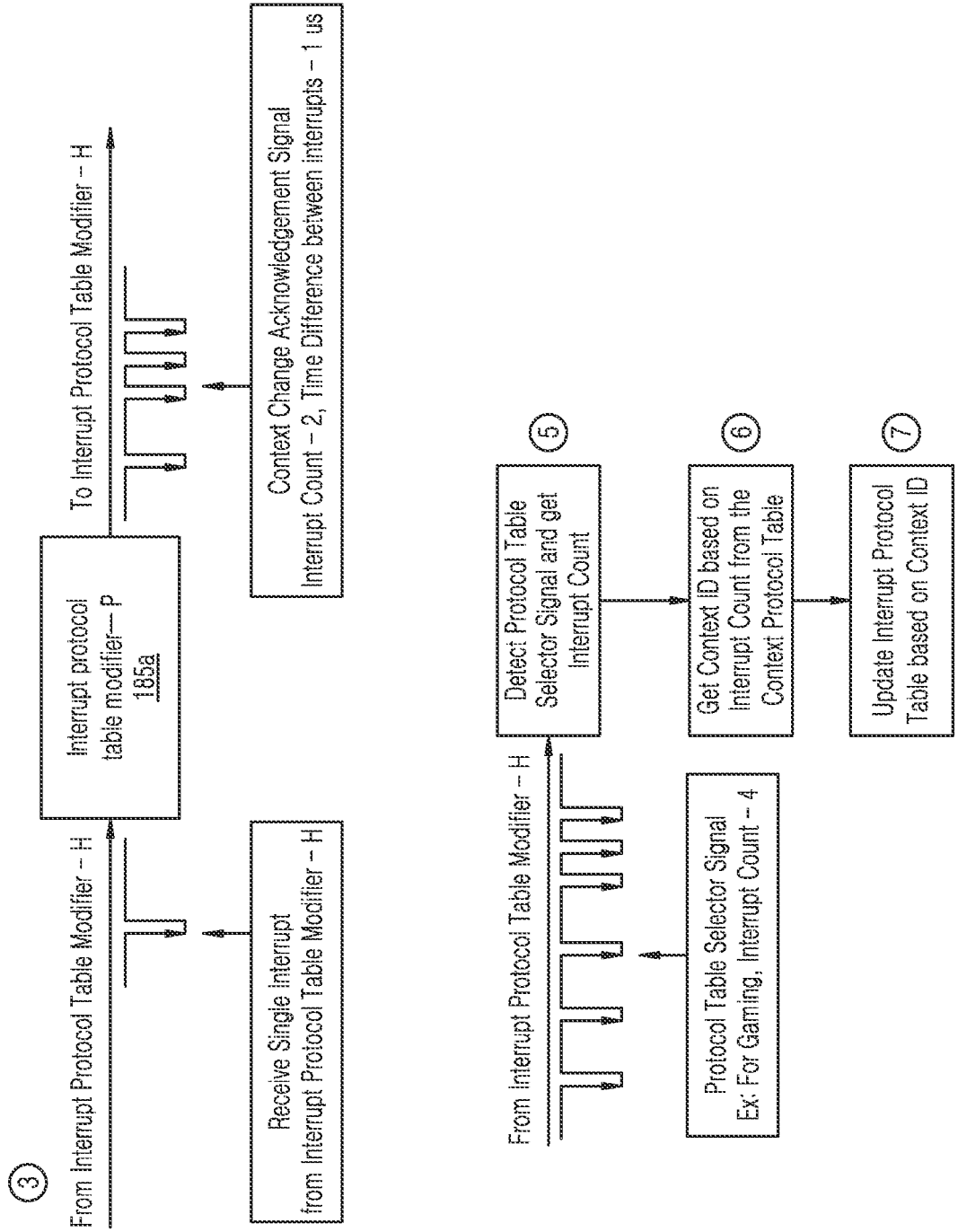
FIG. 3I illustrates modification of the interrupt protocol table based on the context of the application, according to an embodiment as disclosed herein.

FIGS. 3I and 3J illustrate modification of the interrupt protocol table based on the context of the application, according to an embodiment as disclosed herein. Referring to the FIGS. 3I and 3J, at operation 1, the interrupt protocol table modifier—P 185a of the peripheral device 100a is configured to receive the interrupt from the interrupt protocol table modifier—H 184b of the host device 100b. At operation 2, the interrupt protocol table modifier—P 185a determines that the timers in the peripheral device 100a are disabled and in response processes the interrupt sent from the host device 100b. Therefore, a rule followed by the interrupt protocol table modifier—P 185a is as follows: Timers enabled: Internal Interrupt from peripheral device 100a—(Ignore) Timers Disabled: External Interrupt from host device 100b—(Process).

At operation 3, the interrupt protocol table modifier—P 185a notifies the interrupt form data transformer 187a to not process the subsequent keypad events (if any). At operation 4, the interrupt protocol table modifier—P 185a sends an Acknowledgement with End of Data (EOD) to the processor 140b of the host device 100b indicating that the data from the key is ended. For example, a 'Context Change ACK' is sent as interrupt count of 2 with the interrupt time difference of 1 µs. Further, at operation 5, the interrupt protocol table modifier—P 185a receives the interrupts from the interrupt protocol table modifier—H 184b including the context ID.

At operation 6, the interrupt protocol table modifier—P 185a detects the protocol table selector signal and measures the total interrupt count of the interrupts from the interrupt protocol table modifier—H 184b including the context ID. Further, the interrupt protocol table modifier—P 185a determines the context ID from the context protocol table (table. 3). For example, the protocol table selector signal indicated the context as gaming by providing the interrupt count of 4.

TABLE 3

| Applications | Context Category | Context ID | Interrupt Count |
|---|---|---|---|
| Messaging, Notes, etc. | Default | CTX_DF | 3 |
| NFS, Call of Duty, etc. | Gaming | CTX_GM | 4 |
| . . . | . . . | . . . | . . . |

Further, at operation 7, the interrupt protocol table modifier—P 185a updates the protocol table corresponding to the determined context ID. In the above example, an old interrupt protocol table which includes default interrupt count values for arrow keys is modified and an updated interrupt protocol table is generated with reduced interrupt count values for the arrow keys to enhance gaming experience, as the context ID indicated gaming context, as shown in FIGS. 3I and 3J.

Further, at operation 8 the interrupt protocol table modifier—P 185a notifies the interrupt form data transformer 187a to start processing subsequent keypad events (if any).

Figure 4A:
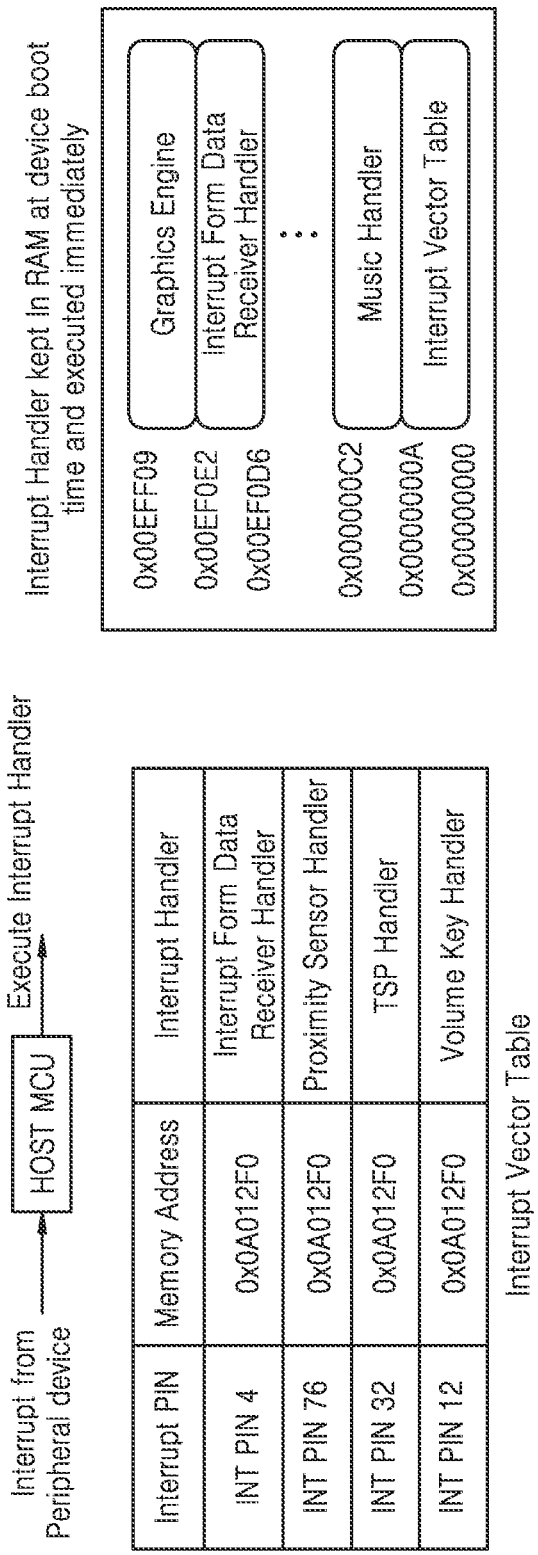
FIG. 4A illustrates working of an Interrupt form data receiver of the host device, according to an embodiment as disclosed herein.

FIG. 4A illustrates working of the Interrupt form data receiver 181b of the host device 100b, according to an embodiment as disclosed herein. Referring to the FIG. 4A, at operation 1, the interrupt controller 141b of the host device 100b receives the interrupt from the peripheral device 100a and notifies the processor 140b. At operation 2, the processor 140b pauses all current task execution and save current execution state in respective registers which includes but is not limited to program counter, flag register, linker register, etc. At operation 3, the processor 140b executes an interrupt handler corresponding to an interrupt pin connected to the peripheral device 100a. The interrupt pin of the peripheral device 100a is kept at highest priority so the interrupt handler associated with the interrupt pin of the peripheral device 100a is executed immediately. Also, interrupt handler instructions are loaded from read only memory (ROM) to random access memory (RAM) at device boot so that the instructions is executed immediately and loading time from the ROM to the RAM is saved.

At operation 4, the interrupt controller 141b is configured to increment the interrupt count and store the current interrupt timestamp in buffer memory and at operation 5, the interrupt controller 141b adds the task in work queue that gets executed in process context and exit from interrupt context so that next interrupt can be received immediately. Further, at operation 6, the interrupt controller 141b checks the time difference between current interrupt and previous interrupt to detect the EOD character and detects the EOD character. For example, if the time difference between the current and the previous interrupt is less than 1 µs for two times consecutively, since the 'EOD' character is interrupt count of 2 with the interrupt time difference of 0.5 µs.

Figure 4B:
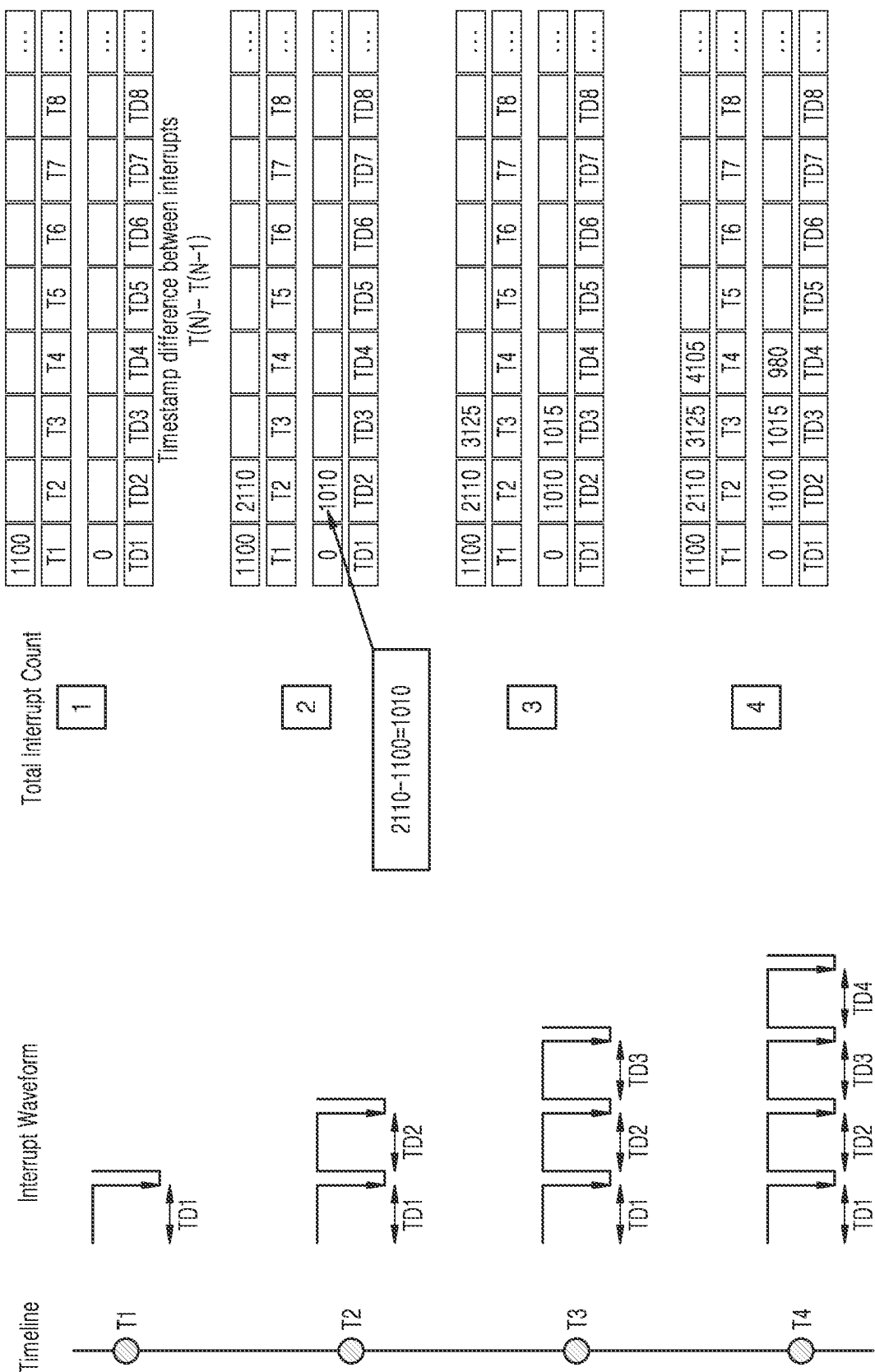
FIG. 4B is illustrates an example of a procedure for pressing and releasing of a key, according to an embodiment as disclosed herein.
Figure 4C:
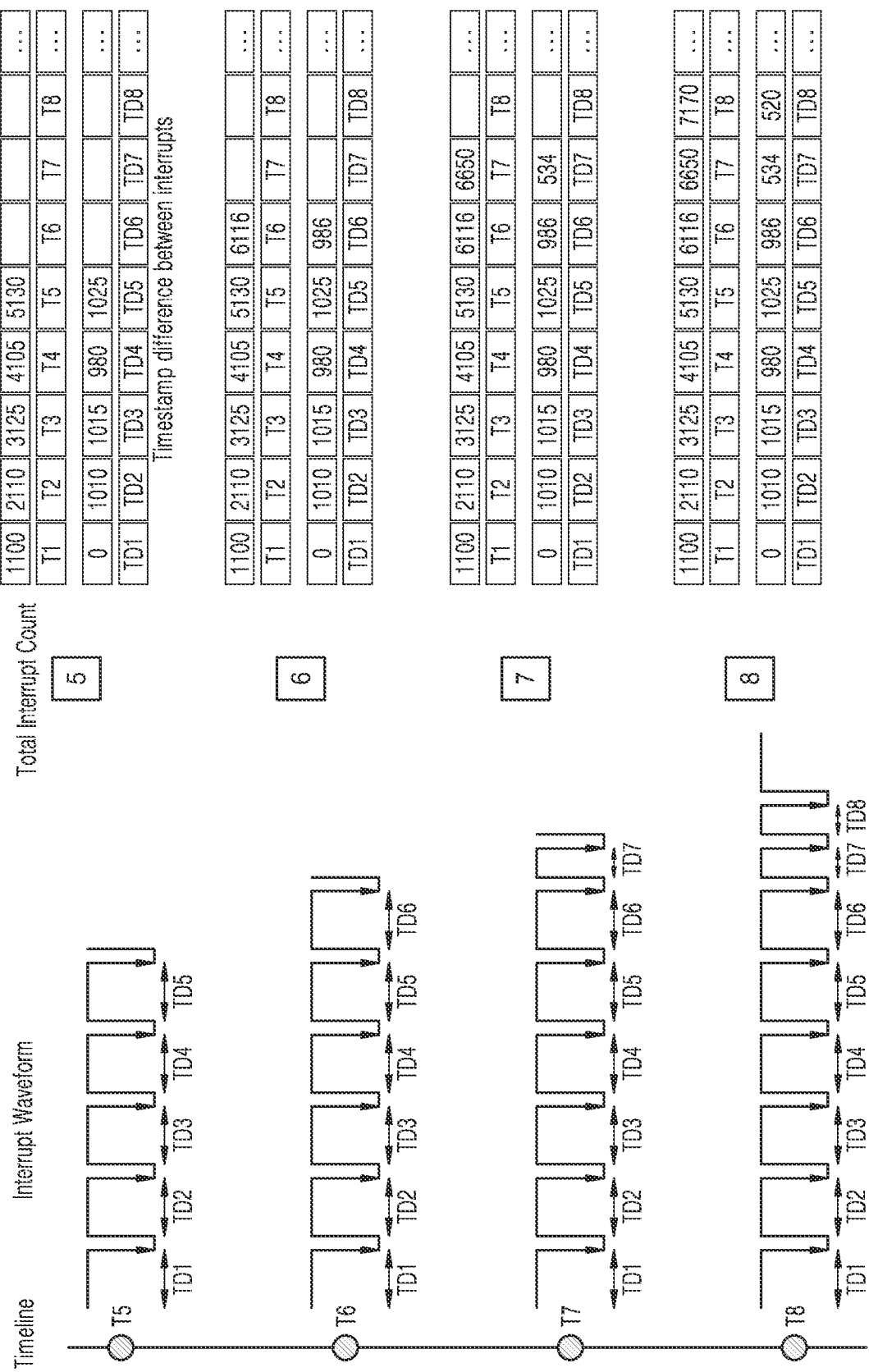
FIG. 4C is illustrates an example of a procedure for pressing and releasing of a key, according to an embodiment as disclosed herein.
Figure 4D:
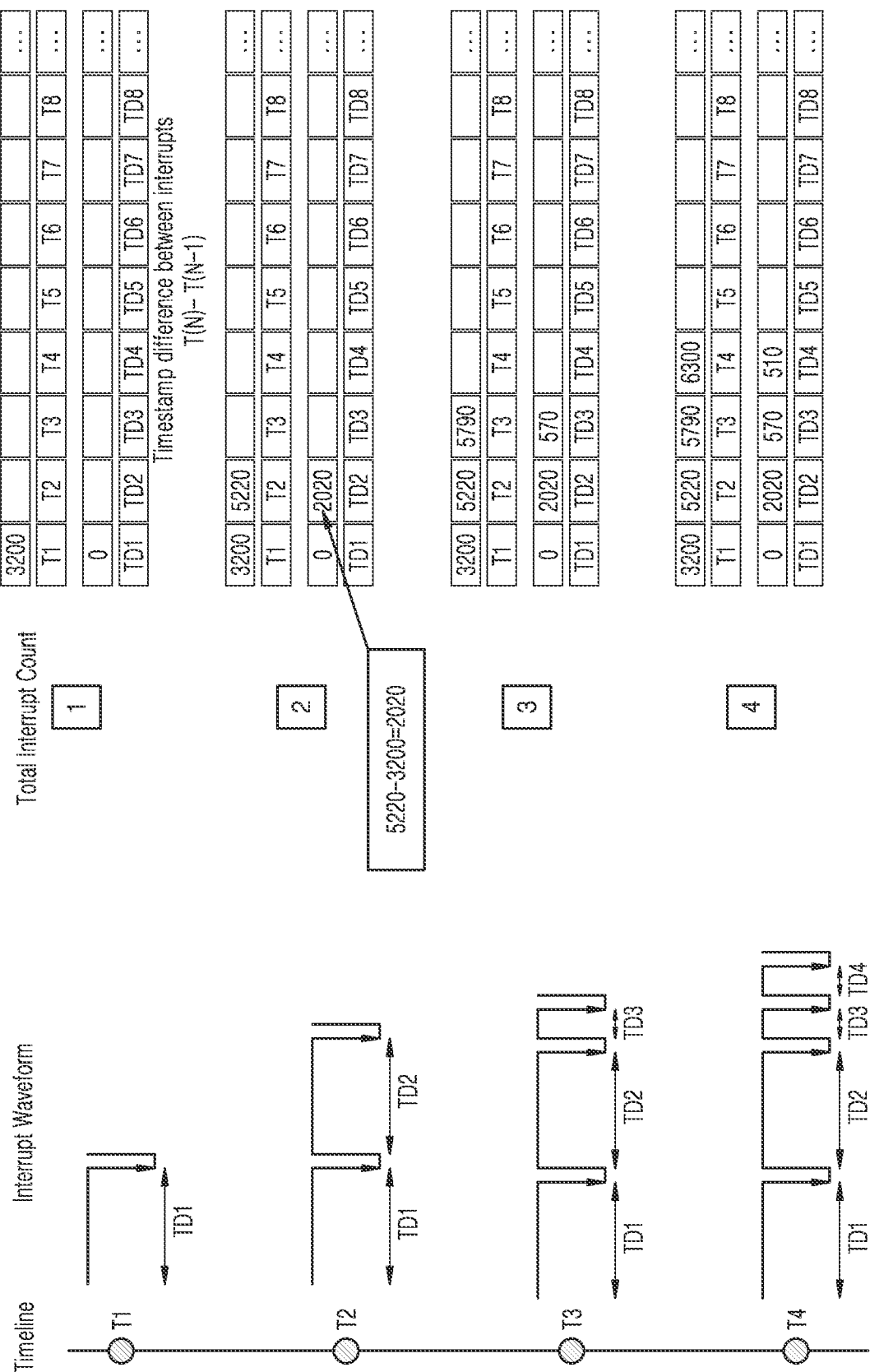
FIG. 4D is illustrates an example of a procedure for pressing and releasing of a key, according to an embodiment as disclosed herein.

FIGS. 4B, 4C and 4D is an example illustrating a procedure for pressing and releasing of the key, according to an embodiment as disclosed herein.

DATA FORMAT for SINGLE KEY PRESS and RELEASE is as table. 4.

TABLE 4 b

| KEY DATA | EOD | RELEASE | EOD |
|---|---|---|---|

When a single key is pressed and released, then release is sent without appending key data which indicates which the key is released because there is only one key pressed. DATA FORMAT for MULTIPLE KEY PRESS and RELEASE is as table. 5.

TABLE 5

| KEY 1 DATA | EOD | KEY 2 DATA | EOD | RELEASE | EOD | KEY 2 DATA | EOD |
|---|---|---|---|---|---|---|---|

When multiple keys are in pressed state, then release is sent including key data appended which indicates which key is released among the pressed keys. Consider for example the KEY_H is pressed and released. The same is executed as shown in FIGS. 4B, 4C and 4D.

Figure 4E:
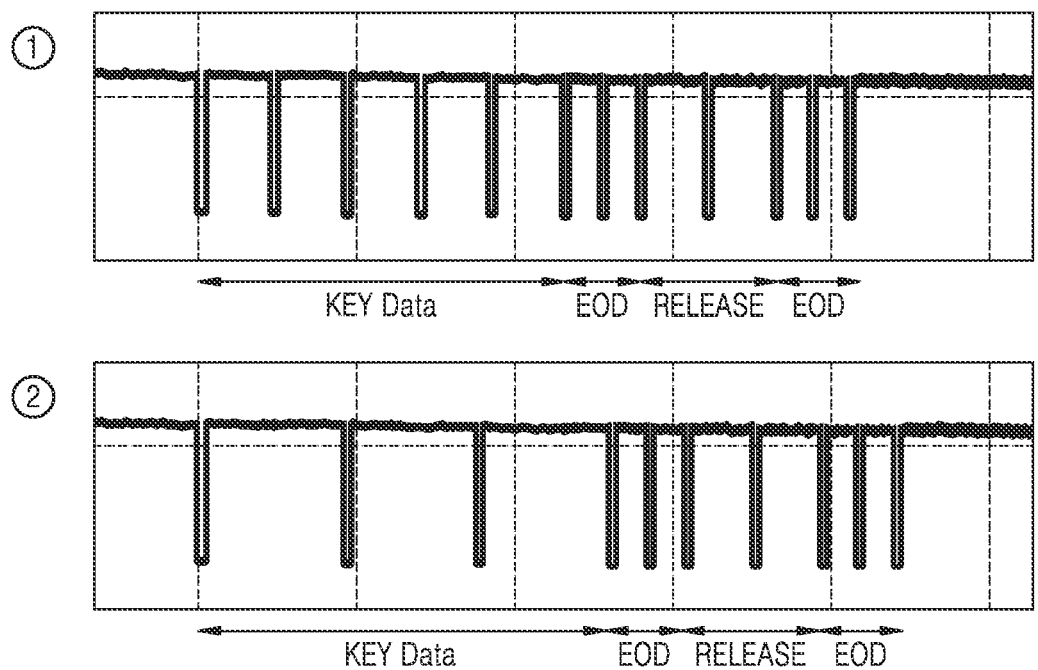
FIG. 4E illustrates an example of waveforms for specific keys pressed on the peripheral device decoded at the host device, according to an embodiment as disclosed herein.

FIG. 4E illustrates example of waveforms for specific keys pressed on the peripheral device 100a decoded at the host device 100b, according to an embodiment as disclosed herein. A waveform for the KEY_H press and release captured using a cathode ray oscilloscope (CRO) is provided at 1. At 2, a waveform for a KEY_I press and release is captured using the CRO.

FIG. 4F illustrates working of the interrupt form data de-transformer 182b of the host device 100b, according to an embodiment as disclosed herein.

Referring to the FIG. 4F, the interrupt form data de-transformer 182b measures a total interrupt count and time difference between each of the interrupts received from the peripheral device 100a and de-transforms the interrupt count and the time difference information to the Key ID based on the interrupt protocol table.

For example, consider that the pressed key is the Key H. The final interrupt waveform for the KEY_H is as provided in operation 1 along timeline with final timestamp of interrupts and final time difference between the interrupts.

$$\text{Interrupt Data Count} = \text{Total Interrupt Count} - EOD \text{ Interrupt Count}$$
$$= 8 - 2 = 6$$

$$\text{Interrupt Data Time Difference} = (TD1 + TD2 + TD3 + TD4 + TD5 + TD6)/(\text{Interrupt Data Count} - 1)$$
$$= (0 + 1010 + 1015 + 980 + 1025 + 986)/5$$
$$= 1003.2 \text{ ns}$$

Consider End of Data (EOD) criteria as two consecutive interrupts with time difference of 0.5 us+/−0.1 us (0.4 us<TD<0.6 us)
  Also, consider Round off Criteria as:
  0.00<=Decimal Part<0.25→0.00
  0.25<=Decimal Part<0.75→0.50
  0.75<=Decimal Part<=0.99→Integer part+1
  Therefore, based on the above:
  Interrupt Data Time Difference (μs)=1003.2/1000=1.0032 μs
  Round Off Interrupt Time Difference to the nearest 0.50=1 μs
  The input [6, 1] is provided to the interrupt protocol map. The interrupt protocol map maps the input 6, 1 to the KEY_H. Similarly, at 2, final interrupt waveform for the RELEASE KEY is provided along with the timeline with final timestamp of interrupts and final time difference between the interrupts. Using the similar calculations as above:

$$\text{Interrupt Data Count} = \text{Total Interrupt Count} - EOD \text{ Interrupt Count}$$
$$= 4 - 2 = 2$$

$$\text{Interrupt Data Time Difference} = (TD1 + TD2)/(\text{Interrupt Data Count} - 1)$$
$$= (0 + 2020)/1$$
$$= 2020.0 \text{ ns}$$

$$\text{Interrupt Data Time Difference (us)} = 2020.0/1000 = 2.020 \ \mu s$$

Round Off Interrupt Time Difference to the nearest 0.50=2 μs
  The input [2, 2] is provided to the interrupt protocol map. The interrupt protocol map maps the input [2, 2] to the RELEASE KEY.

Figure 4G:
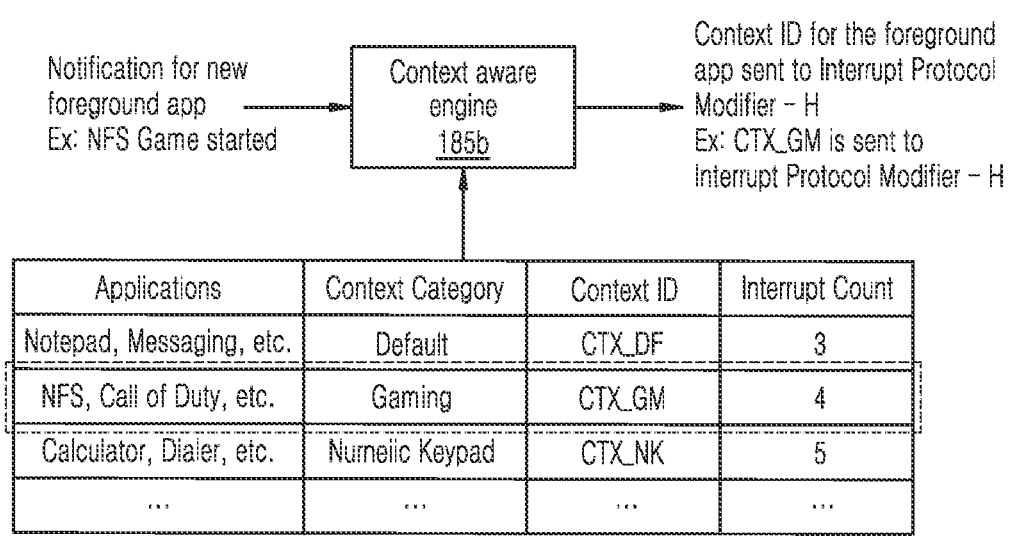
FIG. 4G illustrates a context aware engine of the host device, according to an embodiment as disclosed herein.

FIG. 4G illustrates working of the context aware engine 185b of the host device 100b, according to an embodiment as disclosed herein. Referring to the FIG. 4G, at operation 1, the context aware engine 185b receives the notification for the application which is running in the foreground on the host device 100b and at operation 2, determines the context ID for the application from the Context Protocol Table. Further, at operation 3, the context aware engine 185b determines if a change in the context ID is detected and notifies the same to the interrupt protocol table modifier—H 184b. For example, consider that the context aware engine 185b receives the notification that a NFS Game started and determines a change in the context ID. The, the context aware engine 185b sends the context ID CTX_GM to the interrupt protocol modifier—H 184b.

FIGS. 4H and 4I illustrates working of the interrupt protocol modifier—H 184b of the host device 100b, according to an embodiment as disclosed herein. Referring to the FIGS. 4H and 4I, at operation 1, the interrupt protocol modifier—H 184b receives a new Context ID from the context aware engine 185b and at operation 2, the interrupt protocol modifier—H 184b gets the interrupt count for new context ID from context protocol table. Further, at operation 3, the interrupt protocol modifier—H 184b detects the release of all keys and sends single interrupt to the peripheral MCU. Further, at operation 4, the interrupt protocol modifier—H 184b receives the acknowledgement from the peripheral MCU. For example, the 'Context Change ACK' is received with interrupt count of 2 with interrupt Time Difference of 2 μs. At operation 5, then notifies the interrupt data form de-transformer 182b to not process subsequent events and the interrupts received at this point are internal interrupts and hence are to be ignored. At operation 6, the interrupt protocol modifier—H 184b sends the sends the interrupts to the peripheral device 100b such that it is equal to the interrupt count of the new Context ID. Then, the interrupt protocol modifier—H 184b sends the EOD character. In the above example, the Protocol Table Selector Signal for gaming with interrupt Count of 4 is sent.

At operation 7, the interrupt protocol modifier—H 184b updates the protocol table corresponding to the Context ID, as shown in FIG. 4G, operation 7 and at operation 8, the interrupt protocol modifier—H 184b notifies the interrupt data form de-transformer 182b to start processing subsequent events.

Figure 5:
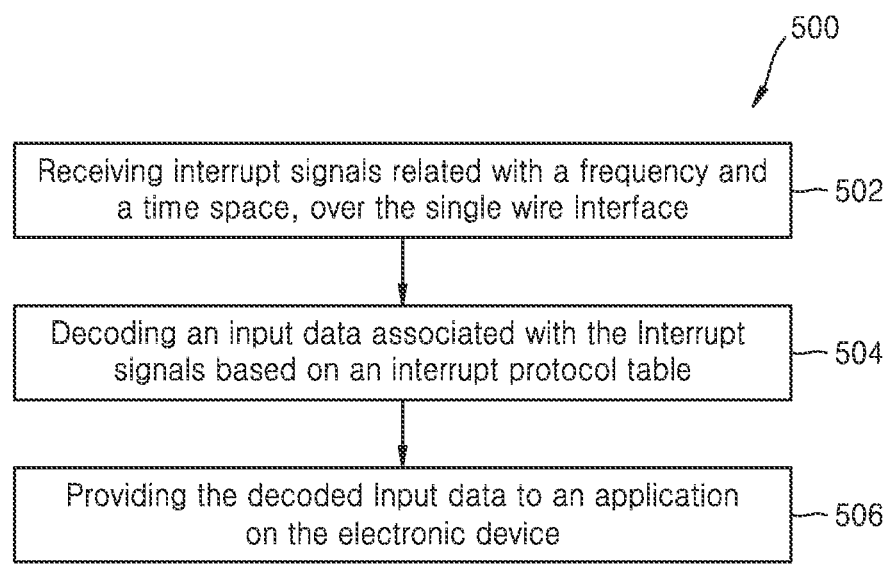
FIG. 5 illustrates a method for communication on the single wire interface by an electronic device, according to an embodiment as disclosed herein.

FIG. 5 is a flow chart 500 illustrating a method for communication on the single wire interface by the electronic device 100a, according to an embodiment as disclosed herein.

Referring to the FIG. 5, at operation 502, the method includes the electronic device 100a receiving the interrupt signals related with the frequency and the time space, over the single wire interface. For example, in the electronic device 100a as illustrated in FIGS. 3A and 3B, the communication manager 180a is configured to receive the interrupt signals related with the frequency and the time space, over the single wire interface.

At operation 504, the method includes the electronic device 100a decoding the input data associated with the interrupt signals based on the interrupt protocol table. For example, in the electronic device 100a as illustrated in FIGS. 3A and 3B, the communication manager 180a is configured to decode the input data associated with the interrupt signals based on the interrupt protocol table.

At operation 506, the method includes the electronic device 100a providing the decoded input data to the application on the electronic device 100b. For example, in the electronic device 100*a* as illustrated in FIGS. 3A and 3B, the communication manager 180*a* is configured to provide the decoded input data to the application on the electronic device 100*b*.

The various actions, acts, blocks, steps, or the like in the flow diagram 500 may be performed in the order presented, in a different order or simultaneously. Further, in an embodiment, some of the actions, acts, blocks, steps, or the like may be omitted, added, modified, skipped, or the like without departing from the scope of the present disclosure.

FIG. 6A illustrates the generation of the interrupt protocol table, according to an embodiment as disclosed herein. Referring to the FIG. 6A, the interrupt protocol table is designed considering certain rules. The rules are based considering the context and the keys/key-set used more frequently by the context of that application. Therefore, the rule for generation of the interrupt protocol table is based on the user behavior.

First rule includes check the context and check a priority of keys/key-set for the context. The priority of the keys/key-set is provided as below:
   Priority Levels: Level 1 (Highest Priority) to LEVEL 10 (Lowest Priority) and Random priority
   High Priority keys are those keys/key-set which are used more frequently by the context
   Low Priority keys are those keys/key-set which are used less frequently by the context
   Random Priority keys have equal probability of usage by the context.

Second rule includes set the input latency values based on the keys/key-set priority i.e., LESS input latency is set for high priority keys and HIGHER input latency is set for low priority keys. The random input latency is set of random priority keys. The FIG. 6A indicates the priority and latency of various keys based on the context of the application.

FIG. 6B is an example illustrating the generation of the interrupt protocol table in various scenarios, according to an embodiment as disclosed herein.

Referring to the FIG. 6B, consider a typing context, then vowels (A, E, I, O, U) have least input latency (4 μs to 7 μs) and consonants have next least latency (8 μs to 17 μs), followed by other keys. Here, the vowel keys have highest priority of LEVEL 1 followed by the consonants which are provided with priority of LEVEL 2. In another example consider a numeric keypad context, then numbers (0, 1, 2, . . . , 9) have least input latency (4 μs to 10 μs) followed by other keys.

Further, a complete interrupt protocol table for the typing context is provided indicating only the interrupt count and the time differences between the interrupts, in table. 6 and the context protocol table is provided in table. 7.

TABLE 6

| Key | Interrupt Count | Time Diff b/w Interrupts (us) |
|---|---|---|
| KEY_A | 4 | 1 |
| KEY_B | 8 | 1 |
| KEY_C | 4 | 2 |
| KEY_D | 9 | 1 |
| KEY_E | 5 | 1 |
| KEY_F | 3 | 3 |
| KEY_G | 10 | 1 |
| KEY_H | 5 | 2 |
| KEY_I | 6 | 1 |
| KEY_J | 11 | 1 |
| KEY_K | 12 | 1 |
| KEY_L | 6 | 2 |

TABLE 6-continued

| Key | Interrupt Count | Time Diff b/w Interrupts (us) |
|---|---|---|
| KEY_M | 4 | 3 |
| KEY_N | 3 | 4 |
| KEY_O | 3 | 2 |
| KEY_P | 13 | 1 |
| KEY_Q | 14 | 1 |
| KEY_R | 7 | 2 |
| KEY_S | 15 | 1 |
| KEY_T | 5 | 3 |
| KEY_U | 7 | 1 |
| KEY_V | 3 | 5 |
| KEY_W | 16 | 1 |
| KEY_X | 8 | 2 |
| KEY_Y | 4 | 4 |
| KEY_Z | 17 | 1 |
| KEY_0 | 23 | 1 |
| KEY_1 | 24 | 1 |
| KEY_2 | 12 | 2 |
| KEY_3 | 8 | 3 |
| KEY_4 | 6 | 4 |
| KEY_5 | 4 | 6 |
| KEY_6 | 3 | 8 |
| KEY_7 | 25 | 1 |
| KEY_8 | 5 | 5 |
| KEY_9 | 26 | 1 |
| KEY_F1 | 13 | 2 |
| KEY_F2 | 27 | 1 |
| KEY_F3 | 9 | 3 |
| KEY_F4 | 3 | 9 |
| KEY_F5 | 28 | 1 |
| KEY_F6 | 14 | 2 |
| KEY_F7 | 7 | 4 |
| KEY_F8 | 4 | 7 |
| KEY_F9 | 29 | 1 |
| KEY_F10 | 30 | 1 |
| KEY_F11 | 15 | 2 |
| KEY_F12 | 10 | 3 |
| KEY_FN | 6 | 5 |
| KEY_DOWN | 5 | 6 |
| KEY_UP | 3 | 10 |
| KEY_LEFT | 31 | 1 |
| KEY_RIGHT | 32 | 1 |
| KEY_SPACE | 18 | 1 |
| KEY_ESC | 16 | 2 |
| KEY_PAGEUP | 8 | 4 |
| KEY_PAGEDOWN | 4 | 8 |
| KEY_ENTER | 9 | 2 |
| KEY_LSHIFT | 6 | 3 |
| KEY_RSHIFT | 3 | 6 |
| KEY_TAB | 33 | 1 |
| KEY_CAPSLOCK | 11 | 3 |
| KEY_CTLR | 3 | 11 |
| KEY_LEFTALT | 34 | 1 |
| KEY_RIGHTALT | 17 | 2 |
| KEY_HOME | 35 | 1 |
| KEY_END | 7 | 5 |
| KEY_DELETE | 5 | 7 |
| KEY_APOSTROPHE | 20 | 1 |
| KEY_BACKSLASH | 11 | 2 |
| KEY_COMMA | 5 | 4 |
| KEY_DOT | 4 | 5 |
| KEY_SEMICOLON | 21 | 1 |
| KEY_SLASH | 7 | 3 |
| KEY_RIGHTBRACE | 3 | 7 |
| KEY_LEFTBRACE | 22 | 1 |
| KEY_BACKSPACE | 19 | 1 |
| KEY_EQUAL | 36 | 1 |
| KEY_MINUS | 18 | 2 |
| KEY_GRAVE | 12 | 3 |
| KEY_HANGEUL | 9 | 4 |
| KEY_LEFTMETA | 6 | 6 |
| KEY_DEX_ON | 4 | 9 |
| KEY_TOUCHPAD_OFF | 3 | 12 |
| KEY_TOUCHPAD_ON | 37 | 1 |
| Release Key | 2 | 2 |

TABLE 6-continued

| Key | Interrupt Count | Time Diff b/w Interrupts (us) |
|---|---|---|
| End of Data (EOD) | 2 | 0.5 |
| Context Change ACK | 2 | 1 |

TABLE 7

| Applications | Context Category | Context ID | Interrupt Count |
|---|---|---|---|
| Notepad, Messaging, etc. | Dafault | CTX_DF | 3 |
| NFS, Call of Duty, etc. | Gaming | CTX_GM | 4 |
| Calculator, Dialer, etc. | Numeric Keypad | CTX_NK | 5 |
| ... | ... | ... | ... |

Figure 7:
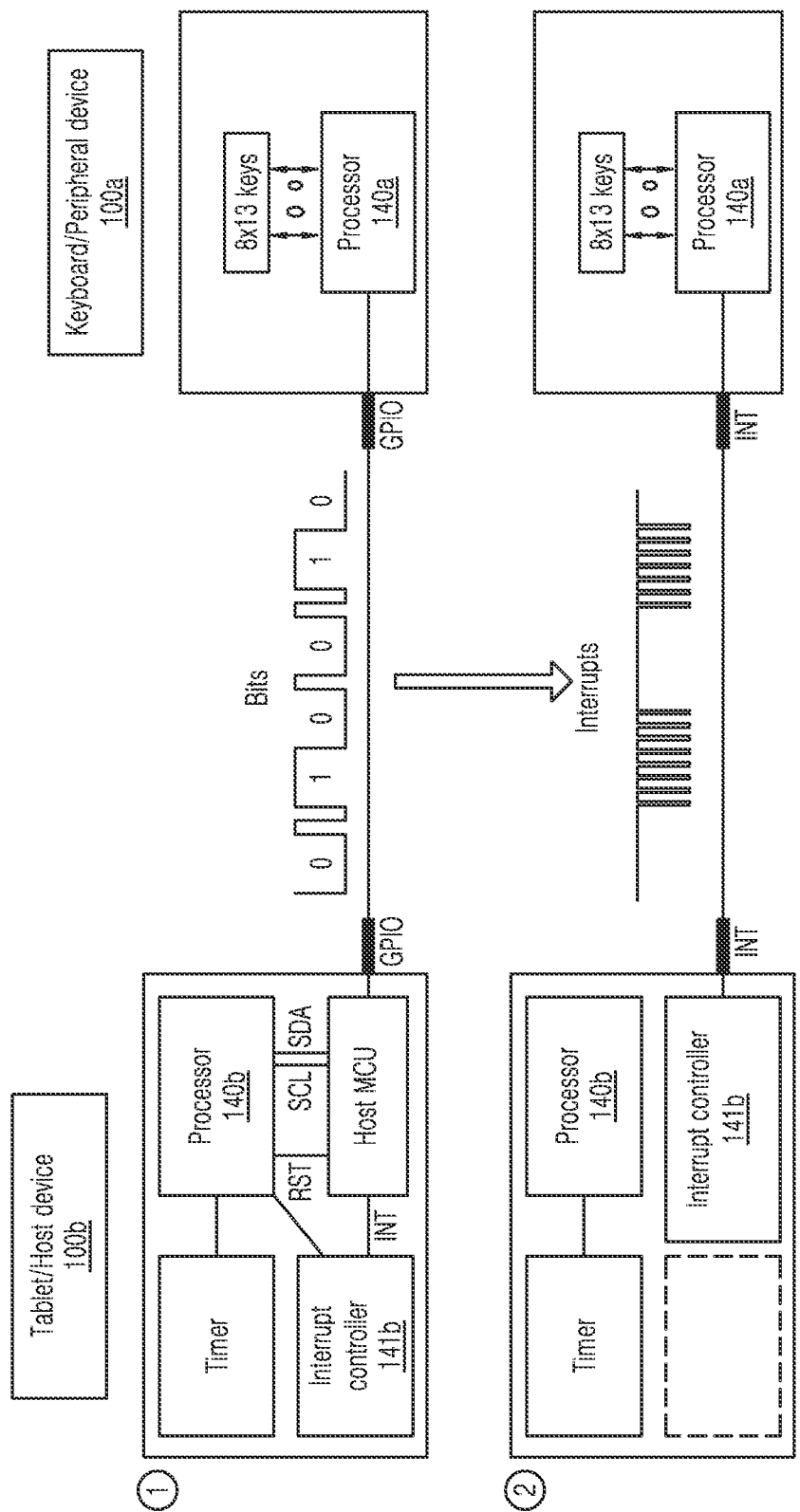
FIG. 7 is an example illustrating removal of a host MCU from the host device, according to an embodiment as disclosed herein.

FIG. 7 is an example illustrating removal of a host MCU from the host device 100b, according to an embodiment as disclosed herein. Referring to the FIG. 7, consider that host device 100b is a tablet and the peripheral device 100a is a keyboard. At operation 1, consider the conventional method of communication between the tablet and the keyboard. In the conventional method, the key pressed by the user on the keyboard was sent by the processor 140a to the processor 140b through the Host MCU in the form of bits. Without the use of the Host MCU, the transmission was not possible as it would result in delays and missing of data.

At operation 2, consider the proposed method of communication between the tablet and the keyboard. In the proposed method, the key pressed by the user on the keyboard is sent by the processor 140a to the processor 140b directly in the form of interrupts which are provided in frequency and time space. As a result, the use and need of the Host MCU is eliminated from the host device 100b. Therefore, the proposed method reduces the cost at the host device 100b end at the same time also addresses the space crunch issue by eliminating a component from the PCB.

Figure 8:
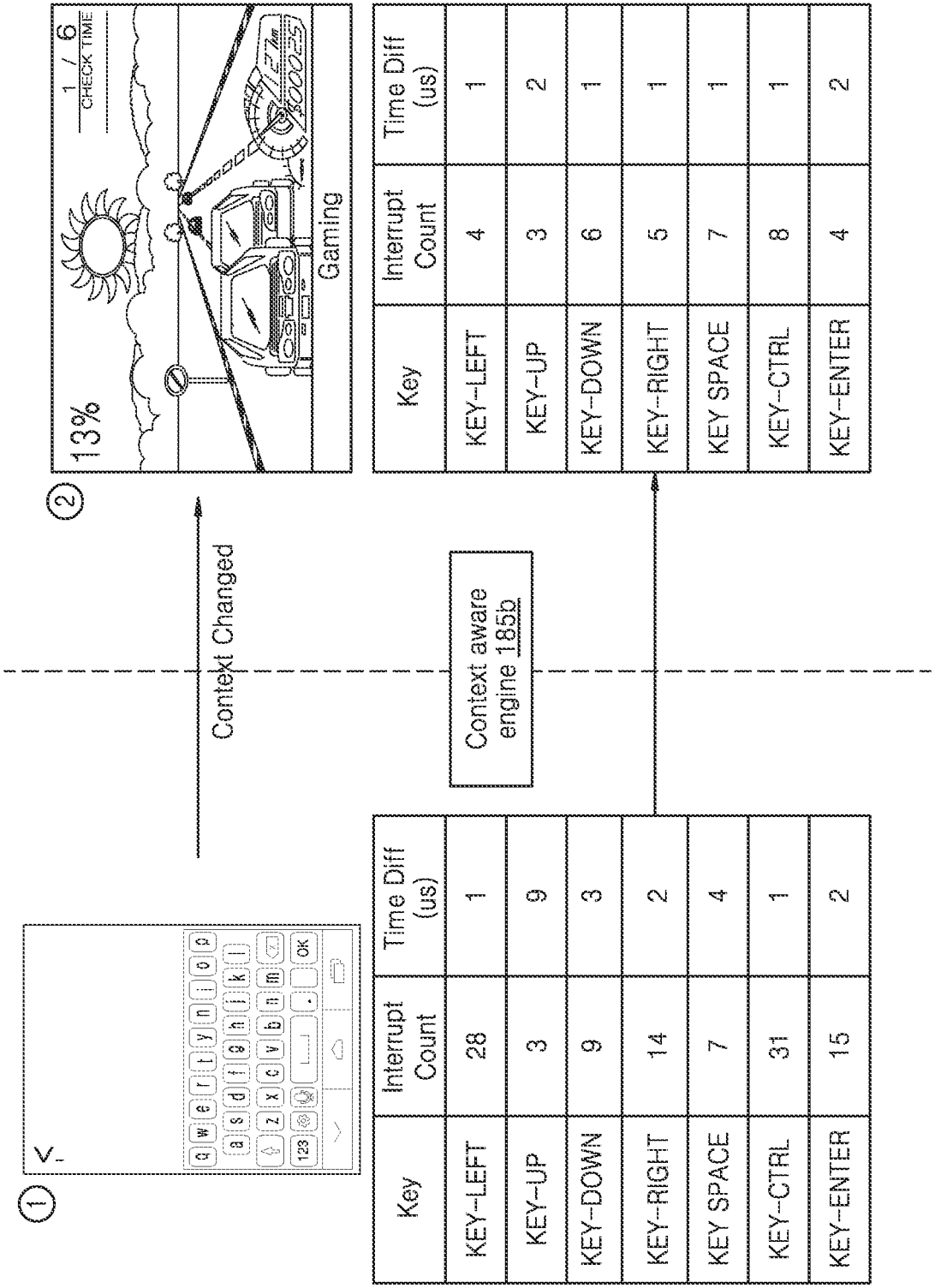
FIG. 8 is an example illustrating use of the context aware engine for enhancing gaming experience, according to an embodiment as disclosed herein.

FIG. 8 is an example illustrating use of the context aware engine 185b for enhancing gaming experience, according to an embodiment as disclosed herein. In FIG. 8, at operation 1, consider that the user is accessing a notes application on the host device 100b. Therefore, the context of the application is typing. As a result, the interrupt protocol table as is provided at 1, where the interrupt count is high for arrow keys and is low for alphabets as alphabets are more frequently used in the typing application than the arrow keys.

At operation 2, the user switches to accessing the gaming application. The context aware engine 185b determines that change in the context of the application and identifies the context as gaming. Therefore, the context aware engine 185b automatically determines the frequently used keys for the gaming context and updates the interrupt protocol table. In the updated interrupt protocol table, the interrupt count is low for the arrow keys to reduce the time of transmission and enhance the gaming experience of the user.

Figure 9B:
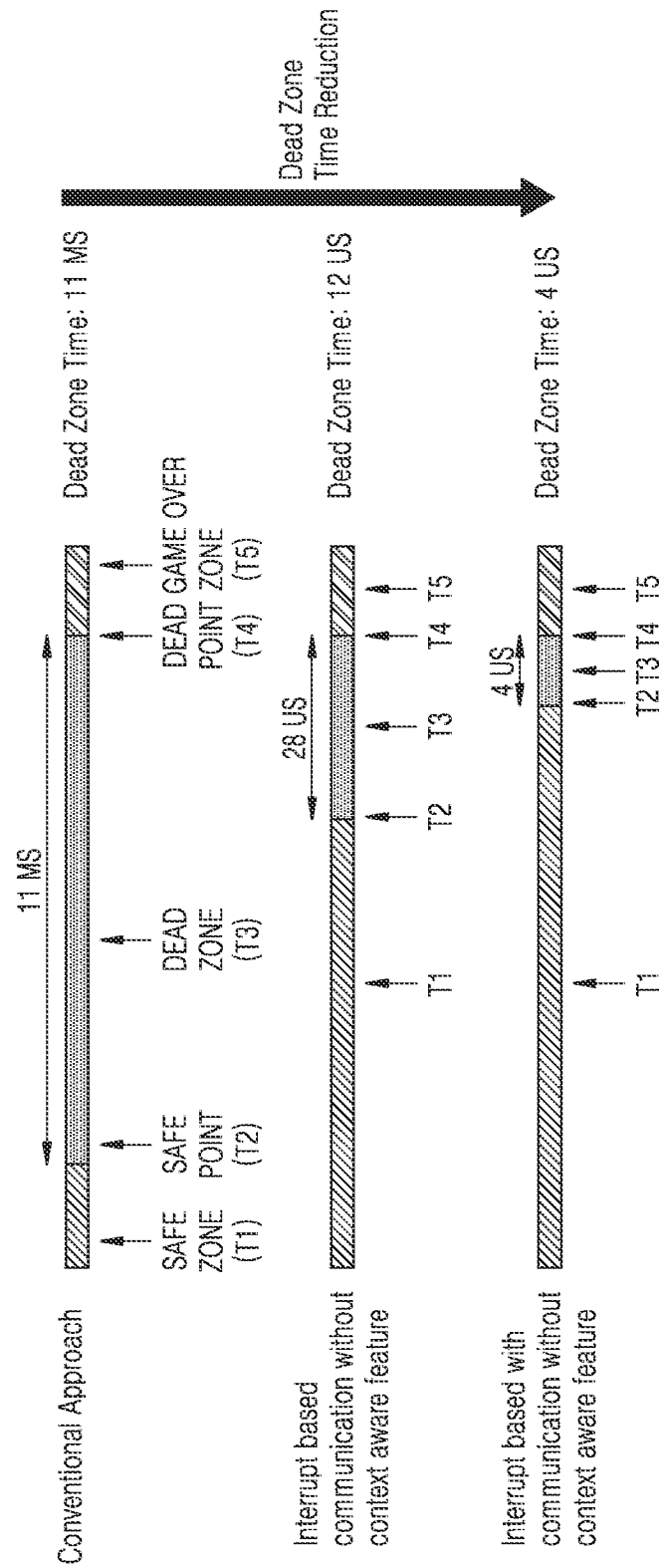
FIG. 9B is a timing diagram illustrating an example of decreased dead zone time due to the introduction of the context aware engine, according to an embodiment as disclosed herein.

FIG. 9A is an example illustrating increased efficiency due to the introduction of the context aware engine 185b for enhancing gaming experience, according to an embodiment as disclosed herein. FIG. 9B is a timing diagram illustrating decrease in dead zone time due to the introduction of the context aware engine 185b, according to an embodiment as disclosed herein. Referring to the FIG. 9A, consider a specific game where a winning player gets a prize of 67232 US Dollars. The sequence of events in the game is as follows in table. 8:

TABLE 8

| Operation no. | Time (ms:us:ns) | Event in the game |
|---|---|---|
| 1 | 60:30:20 | Enemy aimed gun at player to shoot |
| 2 | 65:15:50 | Enemy pressed key to fire bullet from gun |
| 3 | 65:20:10 | Player pressed key (KEY LEFT) to hide behind wall |
| 4 | 66:24:10 | Player key event reached game app (With Context Change Feature) |
| 5 | 66:30:20 | Enemy key event to shoot reached game app |
| 6 | 66:31:20 | Bullet hit Player's Head-Player Died (Without Context Change Feature) |
| 7 | 66:31:20 | Bullet passed without hit-Player Life Saved (With Context Change Feature) |
| 8 | 66:48:10 | Player key event reached game app (Without Context Change Feature) |

At operation 3, at time 65:20:10, the player pressed key (KEY LEFT) to hide behind wall. When the context aware engine 185b is present, at operation 4 the player's key event reaches the game application before the enemy key event to shoot reached the game application. However, in the absence of the context aware engine 185b the player key event reaches the game application at operation 8 after the player dies at operation 6 (due to late reaching of the player key event due to high latency). Therefore, with TIME T1 (without context feature): the key latency time: 28 μs, Other Time: 1 ms, Total Time 1.028 ms. With the TIME T2 (With Context Feature): the key latency time: 4 μs, Other Time: 1 ms, Total Time: 1.004 ms.

Therefore, for such critical case scenario, with the input latency of the KEY LEFT is 28 μs without the context feature, the player died (game over at operation 6) and the enemy won. The player lost a huge sum of 67232 US Dollars (Rs. 5000000).

Similarly, in a critical case scenario the input latency of the KEY LEFT is 4 μs due to the context feature, which automatically detects the game context and modifies the interrupt protocol table with low latency for the keys frequently used in the gaming application which lead to the player life being saved and the player could still win the prize money of 67232 US Dollars.

Referring to the FIG. 9B, safe zone time interval is the time interval when the game player presses the key the game player will remain safe. Safe point time is a maximum time value before which the game player must press the key to remain safe in the game. Dead zone time interval is the time interval when the game player presses the key, the game player will die (game over). Dead point time is maximum time value before which key input must reach the game application. Game over zone time interval when the game player is already dead. Therefore, as indicated in FIG. 9B, the dead zone time for the gaming application when the key events are transmitted in the form of bits is 11 ms. The dead zone time for the gaming application when the key events are transmitted in the form of interrupts but without the use of the context aware feature is 28 μs. When the context aware feature is introduced with the transmission of the key events in the form of interrupts then the dead zone time for the gaming application drastically reduces to 4 μs. Therefore, the FIG. 9B indicates that the introduction of the context aware feature with the transmission of the key events in the form of interrupts intelligently reduces the key latency. Though the same has been indicated with respect to the gaming application, the benefits are not restricted to the same. In emergency situations when messages or calls have to be made, the use of the context aware feature with the transmission of the key events in the form of interrupts will be of great help to the users.

Figure 10C:
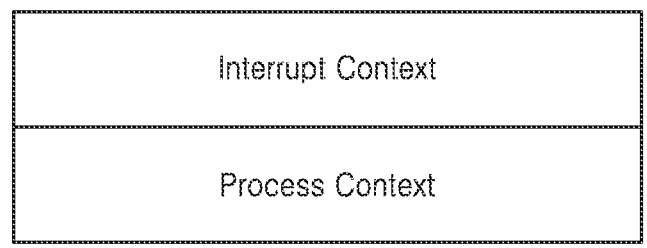
FIG. 10C illustrates interrupt handling code distribution, according to an embodiment as disclosed herein.

FIG. 10A illustrates measurement of main CPU load, according to an embodiment as disclosed herein. In general, CPU Load depends on how many characters are typed per seconds using the keyboard. Currently, world's fastest typing speed is 216 words per minutes having 6 characters in each word on an average. Therefore, the maximum characters typed in a second:=60/(216*6)=0.046 s=46 ms per character→Maximum/Worst Load Case.

In the conventional approach CPU load is determined as: Interrupt (Alert) for data ready+I2C operation for reading every character+Graphics Update. In the proposed approach the CPU load is determined as: Interrupts for every character+Graphics Update.

Therefore, the CPU load of the proposed approach is same as the CPU load of the conventional approach since there is no problem in functionalities of other modules in the conventional approach. Similarly, there is no problem in functionalities of other modules (Touch, Audio, etc.) in the proposed approach as well because the CPU Load is the same.

Referring to the FIG. 10A, at 1, the number of typing (idle case) on a main application processor CPU available is approximately 757% and hence the CPU Usage is approximately 43%.

At 2, consider fastest typing in the conventional approach. Then on the main application processor (not extra MCU) the main load is of the graphics part. Minimal load: Interrupts (Alert)+I2C Part. Therefore, the CPU is available for approximately 569% and the CPU Usage is approximately 231%. Similarly, at 3, the fastest typing in the proposed approach. Then on the main application processor the main load is of the graphics part and minimal load is Interrupts Data Protocol. The CPU available is approximately 574% and the CPU usage is approximately 226%.

Consider the CPU Load captured using a shell "top" command on a specific tablet device. At 4, consider the idle case. The CPU available is approximately −750% and the CPU usage is approximately −50% i.e., (713+762+751+761+759+751+759)/7=750). At 5, consider load due to Interrupts Handling+Measure Interrupt Count and time difference+Data Transformation to actual key value. The CPU available is approximately 754% and the CPU usage is approximately 52% i.e., (730+763+761+757+764)/5=754 Therefore, from operations 4 and 5, only 4% CPU is used by the proposed solution i.e., (754−750=4%) and effective CPU Usage=0.5% (4/800*100).

Consider the CPU Load captured using the shell "top" command on a specific tablet device. At 6, consider the idle case. The CPU available is approximately 750% and the CPU Usage is approximately 50% i.e., (713+762+751+761+759+751+759)/7=750). At 7, consider load due to Interrupts Handling+I2C operation for read actual key data. The CPU Available is approximately 748% and the CPU Usage is approximately 52% i.e., (702+758+748+761+757+757+754)/7=748). Therefore, from operations 6 and 7, only 2% CPU is used by conventional solution i.e., (750−748=2%) and effective CPU Usage=0.25% (2/800*100).

In the conventional method, there are Tasks on 1 core Extra/Dedicated MCU. Such as
 1. Periodically, poll/read the data sent by Keyboard MCU
 2. Send the interrupt to Main CPU when data is ready
 3. Handle I2C operation for sending key data to Main CPU
 4. Other general operating system tasks.

Load on Extra/Dedicated MCU processor: Does not matter because we are "not" performing these operations in proposed solution and also does not affect load on Main CPU.

Tasks on 8 cores Main CPU
 1. Receive single interrupt from Tablet MCU as an "alert" to start reading key data using I2C operation for every key pressed
 2. Read Key data bytes from Tablet MCU using I2C operation
 3. Process and send Key Data to Upper Layer/Application
 4. Display result on UI/Update UI for every key pressed.
 8 cores CPU usage for 1+2=2% Effective CPU usage for 1+2=(2/800)*100=0.25% 8 cores CPU usage for 3+4: Does not matter because it is same in both solutions & belongs to other module.

Tasks on 8 cores Main CPU:
 1. Receive interrupts from Keyboard MCU
 2.1 Measure total count of interrupts and time difference between each interrupt
 2.2 Transform interrupt form data to actual Key data 3. Process and send Key Data to Upper Layer/Application 4. Display result on UI/Update UI for every key pressed.
 8 cores CPU usage for 1+2=4% Effective CPU usage for 1+2=(4/800)*100=0.5%. 8 cores CPU usage for 3+4: Does not matter because it is same in both solutions & belongs to other module.

Load Difference between Proposed and Conventional Solution=0.5−0.25=0.25%.

Since point 1 and 2 are new tasks added on the Main CPU in Proposed Solution which is consuming only 0.5% of CPU so there is no problem in working of other applications in parallel to keyboard typing with proposed protocol.

FIG. 10B illustrates interrupt handling code distribution, according to an embodiment as disclosed herein. When interrupts occur on some processor core, the code execution is divided to run in interrupt context and process context.

In Interrupt Context, code which needs to process immediately is executed. One of the processor cores is dedicatedly executing the interrupt context code. In multi core processor system having Octa-Core, other cores can still perform respective tasks in parallel. Also, very Minimal Work executes in the interrupt context. Such as for example,
 1. getting current timestamp in nanoseconds (Jump & Store instruction)→6 clock cycles.
 2. Store timestamp in buffer (Store instruction)→3 clock cycles.

Incremental interrupt count (Addition instruction)→2 clock cycles.

Minimum Core Processor Speed=1.8 GHz on the tablet→0.55 ns per clock cycles.

Total Clock Cycles=11∥Total Time=0.55*11=6.05 ns. Since only around 11 clock cycles (6.05 ns) are used dedicatedly by one of the core and other cores are also there to executes tasks and there are other interrupt pins for other modules, so there is no problem in execution of other modules at the same time.

In Process Context, the code which does not need to process immediately is executed here. Some processor core is not dedicatedly occupied for execution of the process context part. The code is executed based on usual scheduling.

Major work executes in the process context. This includes measuring the time difference between each of the interrupts, detecting EOD, calculating total number of interrupts excluding EOD, transforming interrupt data information to get actual character, sending actual character to the application, etc. Since the code operations runs in the process context and executes normally based on scheduling, there is no problem in execution of other modules in parallel with execution of this part.

Figure 11A:
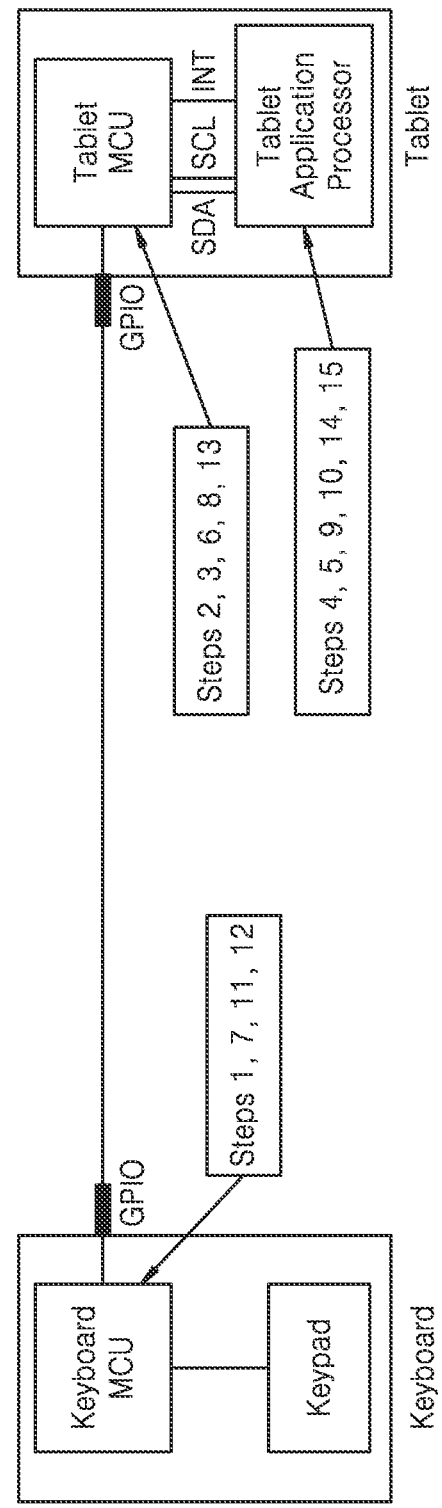
FIG. 11A illustrates the conventional method of communication between the peripheral and the host device, according to the related art.

FIG. 11A illustrates the conventional method of communication between the peripheral device 100a and the host device 100b, according to the related art. Consider the peripheral device 100a is the keyboard and the host device 100b is the tablet. At operation 1, the keyboard MCU sends 8 bytes of data to the Tablet MCU for "new data indication". At operation 2, the tablet MCU reads the 8 bytes (64 bits) though polling mechanism every 1 µs periodically which takes around 64 µs and at operation 3, the tablet MCU sends the interrupt as an alert to Main CPU to start reading data using I2C communication protocol. Further, at operation 4, the main CPU executes the interrupt handler in process context (not interrupt context) after waiting for some time usually around 100-200 µs. At operation 4, the main CPU reads 8 bytes of data through I2C communication protocol which takes around 150 µs and the operation 6, the tablet MCU sends 8 bytes of data to the keyboard MCU for "synchronization/acknowledgement".

At operation 7, the keyboard MCU reads the 8 bytes sent by the tablet though polling mechanism every 1 µs periodically which takes around 64 µs and at operation 8, the tablet MCU sends interrupt as an alert to Main CPU to inform about "synchronization/acknowledgement". At operation 9, the main CPU executes interrupt handler in process context (not interrupt context) after waiting for some time usually around 100-200 µs and operation 10, the main CPU reads 8 bytes of data through I2C communication protocol which takes around 150 µs. Further, at operation 11, the keyboard MCU performs some operations before sending actual key data which takes some time usually around 3 ms (3000 µs) and at operation 12, the keyboard MCU sends last 9 bytes which is "actual data of key". At operation 13, the tablet MCU reads the 9 bytes (72 bits) though polling mechanism every 1 µs periodically which takes around 72 µs, at operation 14, the main CPU reads 9 bytes of actual key data through I2C communication protocol which takes around 150 µs and at operation 15, the main CPU sends the key character to upper layer/application.

Figure 11B:
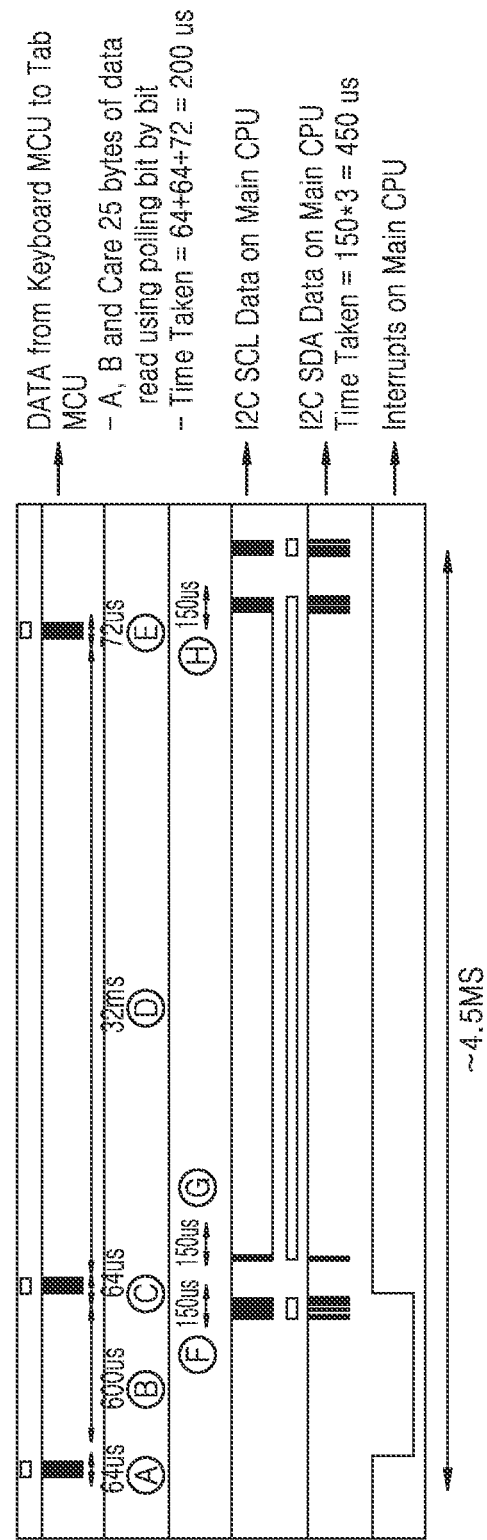
FIG. 11B is a timing diagram illustrating the conventional method of communication between the peripheral device and the host device, according to the related art.

FIG. 11B is a timing diagram illustrating the conventional method of communication between the peripheral device 100a and the host device 100b, according to the related art. Points A, B and C are 25 bytes of data read using polling at 1 µs bit by bit—Time Taken=64+64+72=~200 µs.

Point B is AP processing time as it needs to handle other operations too. Therefore, the point B is variable time depending on activities going on in the main CPU and the time taken is approximately 600 µs.

Point D is keyboard MCU processing time delay as it is only 32 MHz and also has other operations to perform. Therefore, the point D is variable time depending on activities going on in the Keyboard MCU like general OS tasks, reading from accelerometer, etc. The time taken is approximately 3.2 ms. Point F, G, H are I2C communication time delays because the main CPU uses I2C to read data from the tablet MCU and the time taken is 150+150+150=~450 µs.

In an embodiment, a first electronic device (100b) for communication with a second electronic device (100a) on a single wire interface, the first electronic device (100b) may comprise: a memory (120b) and a processor (140b) executing an application stored in the memory (120b).

In an embodiment, the processor (140b) may be configured to: receive, from the second electronic device (100a), interrupt signals related with a frequency and a time space, over the single wire interface.

In an embodiment, the processor (140b) may be configured to: decode an input data associated with the interrupt signals based on an interrupt protocol table.

In an embodiment, the processor (140b) may be configured to: provide the decoded input data to the application on the first electronic device (100b).

In an embodiment, the first electronic device (100b) may be a host device and the second electronic device (100a) may be a peripheral device, and the first electronic device (100b) and the second electronic device (100a) may be connected over a single wire.

In an embodiment, the interrupt protocol table may comprise a specific pattern of at least one of the frequency space or the time space for each input data.

In an embodiment, each of the interrupt signal related with the frequency and the time space may be differentiated based on at least one of (i) an interrupt count indicating the frequency space or (ii) a first pattern of time difference between each of the interrupt signals, the first pattern of time difference indicating the time space and wherein the at least one of the frequency space and the time space for a specific input data is determined based on the interrupt protocol table.

In an embodiment, the processor (140b) may be further configured to: increment the interrupt count associated with the each of the interrupt signals while receiving the interrupt signals from the second electronic device (100a); store a current interrupt timestamp associated with each of the interrupt signals in a memory buffer of the first electronic device (100b); and detect an end of the input data based on a second pattern of time difference between two interrupt signals of the interrupt signals.

In an embodiment, the processor (140b) is configured to decode the input data associated with the interrupt signals based on the interrupt protocol table may comprise: determine the interrupt count, the first pattern of the time difference between each of the at least two interrupt signals and the second pattern of time difference between two interrupt signals of the at least two interrupt signals; and de-transform the interrupt count and the first pattern of the time difference between each of the at least two interrupt signals to the input data based on the interrupt protocol table.

In an embodiment, the processor (140b) may be further configured to: determine the application running on the first electronic device (100b); determine a specific pattern of the interrupt count based on a context identity for the application from a context protocol table, wherein the context identity represents at least one context category for the application; generate a new interrupt protocol table based on the context category for the application; and send the specific pattern of the interrupt count to the second electronic device (100a) indicating the context category for the application.

In an embodiment, the context protocol table may comprise each of the applications of the first electronic device (100b) mapped to at least one context category, the context identity associated with the at least one context category and a specific pattern of the interrupt count for the at least one context category.

In an embodiment, the processor (140b) configured to generate the new interrupt protocol table based on the context category for the application may be further configured to: identify the at least one context category for the application; change the interrupt count and the first pattern of the time difference between each of the at least two interrupt signals for a set of input data; and generate the new interrupt protocol table with the changed interrupt count and the first pattern of the time difference between each of the at least two interrupt signals for the set of input data.

In an embodiment, the processor (140b) configured to change the interrupt count and the first pattern of the time difference between each of the at least two interrupt signals for the determined set of keys may be further configured to: determine a new priority of the set of input data based on the identified at least one context category, wherein at least one input data of the set of input data that are frequently operated during the identified at least one context category are allocated higher priority than other input data in the set of input data; and determine a new input latency value for the each of the set of input data based on the new priority, wherein the input data with higher priority are allocated lower input latency value than the other input data in the set of input data.

In an embodiment, the processor (140b) configured to change the interrupt count and the first pattern of the time difference between each of the at least two interrupt signals for the determined set of keys may be further configured to change the interrupt count and the first pattern of the time difference between each of the at least two interrupt signals for the determined set of input data, based on the new priority and the new input latency value.

In an embodiment, a second electronic device (100a) for communication with a first electronic device (100b) on a single wire interface, may comprise a processor (140a).

In an embodiment, the processor (140a) may be configured to: transform an input data into interrupt signals related with a frequency and a time space using an interrupt protocol table.

In an embodiment, the processor (140a) may be configured to: transmit the interrupt signals to the first electronic device (100b) on the single wire interface.

In an embodiment, each of the interrupt signals related with the frequency and the time space may be differentiated based on at least one of (i) an interrupt count indicating the frequency space or (ii) a first pattern of time difference between each of the interrupt signals indicating the time space, and the at least one of the frequency space and the time space for a specific input data may be determined based on the interrupt protocol table.

In an embodiment, the processor (140a) configured to transform the input data into interrupt signals related with the frequency and the time space using the interrupt protocol table may be further configured to: decode the input data using an input data mapping table; determine a value associated with the input data; and transform the determined value associated with the input data into the interrupt signals using the interrupt protocol table, wherein the interrupt signals are a combination of an interrupt count and a first pattern of the time difference between each of the interrupt signals.

In an embodiment, the processor (140a) may be further configured to: receive a specific pattern of the interrupt count from the first electronic device (100b); determine a context identity for an application from the specific pattern of the interrupt count using a context protocol table; and generate a new interrupt protocol table based on the context category for the application.

In an embodiment, the context protocol table may comprise each of the applications of the first electronic device (100b), which are mapped to at least one context category, the context identity associated with the at least one context category and a specific pattern of the interrupt count for the at least one context category.

In an embodiment, a method may be performed by a computer system including a first electronic device (100b) and a second electronic device (100a) communicating with the first electronic device (100b) on a single wire interface.

In an embodiment, the method may comprise: at the second electronic device (100b), transforming an input data into interrupt signals related with a frequency and a time space using a first interrupt protocol table; and transmitting the interrupt signals to the first electronic device (100a) on the single wire interface.

In an embodiment, the method may comprise: at the first electronic device (100a), receiving, from the second electronic device (100b), the interrupt signals over the single wire interface; decoding the input data associated with the interrupt signals based on a second interrupt protocol table; and providing the decoded input data to an application on the first electronic device (100b).

In an embodiment, the first electronic device (100b) may be a host device and the second electronic device (100a) may be a peripheral device, and the first electronic device (100b) and the second electronic device (100a) may be connected over a single wire.

In an embodiment, the first interrupt protocol table may be stored in the second electronic device (100b) and the second interrupt protocol table may be stored in the first electronic device (100a).

In an embodiment, a method may be performed by a first electronic device (100b) for communication with a second electronic device (100a) on a single wire interface.

In an embodiment, the method may comprise: receiving, from the second electronic device (100a), interrupt signals related with a frequency and a time space, over the single wire interface.

In an embodiment, the method may comprise: decoding an input data associated with the interrupt signals based on an interrupt protocol table.

In an embodiment, the method may comprise: providing the decoded input data to an application on the first electronic device (100b).

In an embodiment, the first electronic device (100b) may be a host device and the second electronic device (100a) may be a peripheral device, and the first electronic device (100b) and the second electronic device (100a) may be connected over a single wire.

In an embodiment, the interrupt protocol table may comprise a specific pattern of at least one of the frequency space or the time space for each input data.

In an embodiment, each of the interrupt signals related with the frequency and the time space may be differentiated based on at least one of (i) an interrupt count indicating the frequency space or (ii) a first pattern of time difference between each of the interrupt signals, the first pattern of time difference indicating the time space, and the at least one of the frequency space or the time space for a specific input data may be determined based on the interrupt protocol table.

In an embodiment, the method may further comprise: incrementing the interrupt count associated with the each of the interrupt signals that are received from the second electronic device (100a); storing a current interrupt timestamp associated with each of the interrupt signals in a memory buffer of the first electronic device (100b); and detecting an end of the input data based on a second pattern of time difference between two interrupt signals of the interrupt signals.

In an embodiment, the decoding the input data associated with the interrupt signals based on the interrupt protocol table may comprise: determining the interrupt count, the first pattern of the time difference between each of the at least two interrupt signals, and the second pattern of the time difference between two interrupt signals of the at least two interrupt signals; and de-transforming the interrupt count and the first pattern of the time difference between each of the two interrupt signals to the input data based on the interrupt protocol table.

In an embodiment, the method may further comprise: determining the application running on the first electronic device (100b); determining a specific pattern of the interrupt count based on a context identity for the application from a context protocol table, wherein the context identity represents at least one context category for the application; generating a new interrupt protocol table based on the context category for the application; and sending the specific pattern of the interrupt count to the second electronic device (100a) indicating the context category for the application.

In an embodiment, the context protocol table may comprise each of the applications of the first electronic device (100b) mapped to at least one context category, the context identity associated with the at least one context category and a specific pattern of the interrupt count for the at least one context category.

In an embodiment, the generating the new interrupt protocol table based on the context category for the application may comprise: identifying the at least one context category for the application; changing the interrupt count and the first pattern of the time difference between each of the at least two interrupt signals for a set of input data; and generating the new interrupt protocol table with the changed interrupt count and the first pattern of the time difference between each of the at least two interrupt signals for the set of input data.

In an embodiment, the changing the interrupt count and the first pattern of the time difference between each of the at least two interrupt signals for the determined set of keys may comprise: determining a new priority of the set of input data based on the identified at least one context category, wherein at least one input data of the set of input data that are frequently operated during the identified at least one context category are allocated higher priority than other input data in the set of input data; and determining a new input latency value for the each of the set of input data based on the new priority, wherein the input data with higher priority are allocated lower input latency value than the other input data in the set of input data.

In an embodiment, the changing the interrupt count and the first pattern of the time difference between each of the at least two interrupt signals for the determined set of keys may further comprise changing the interrupt count and the first pattern of the time difference between each of the at least two interrupt signals for the determined set of input data, based on the new priority and the new input latency value.

In an embodiment, a method may be performed by a second electronic device (100a) for communication with a first electronic device (100b) on a single wire interface.

In an embodiment, the method may comprise: transforming an input data into interrupt signals related with a frequency and a time space using an interrupt protocol table.

In an embodiment, the method may comprise: transmitting the interrupt signals to the first electronic device (100b) on the single wire interface.

In an embodiment, each of the interrupt signals related with the frequency and the time space may be differentiated based on at least one of interrupt counts indicating (i) the frequency space or (ii) a first pattern of time difference between each of the interrupt signals indicating the time space, and the at least one of the frequency space or the time space for a specific input data may be determined based on the interrupt protocol table.

In an embodiment, the transforming the input data into interrupt signals related with the frequency and the time space using the interrupt protocol table may further comprise: decoding the input data using an input data mapping table; determining a value associated with the input data; and transforming the determined value associated with the input data into the interrupt signals using the interrupt protocol table, wherein the interrupt signals are a combination of an interrupt count and a first pattern of the time difference between each of the interrupt signals.

In an embodiment, the method may further comprise: receiving a specific pattern of the interrupt count from the first electronic device (100b); determining a context identity for an application from the specific pattern of the interrupt count using a context protocol table; and generating a new interrupt protocol table based on the context category for the application.

In an embodiment, the context protocol table may comprise each of the applications of the first electronic device (100b), which are mapped to at least one context category, the context identity associated with the at least one context category and the specific pattern of the interrupt count for the at least one context category.

What is claimed is:

1. A first electronic device for communication with a second electronic device on a single wire interface, the first electronic device comprising:
a memory; and
a processor executing an application stored in the memory, the processor being configured to:
receive, from the second electronic device, interrupt signals over the single wire interface, each of the interrupt signals including an interrupt count and a time difference, an interrupt signal corresponding to an input data provided by a user;
decode the input data corresponding to the interrupt signal, based on an interrupt protocol table; and
provide the decoded input data to the application on the first electronic device.

2. The first electronic device of claim 1, wherein:
the first electronic device is a host device and the second electronic device is a peripheral device, and
the first electronic device and the second electronic device are connected over a single wire.

3. The first electronic device of claim 1, wherein the interrupt protocol table comprises a specific pattern of at least one of the interrupt count or the time difference for each input data.

4. The first electronic device of claim 1, wherein the interrupt signals are differentiated based on at least one of the interrupt count or the time difference, and
wherein the at least one of the interrupt count or the time difference is determined based on the interrupt protocol table.

5. The first electronic device of claim 4, wherein the processor is further configured to:
increment the interrupt count associated with the each of the interrupt signals after receiving the interrupt signals from the second electronic device;
store a current interrupt timestamp associated with the each of the interrupt signals in a memory buffer of the first electronic device; and
detect an end of the input data based on a second pattern of time difference between two interrupt signals of the interrupt signals.

6. The first electronic device of claim 5, wherein the processor is configured to decode the input data associated with the interrupt signals based on the interrupt protocol table comprises:
determine the interrupt count, a first pattern of the time difference between each of the at least two interrupt signals and the second pattern of time difference between two interrupt signals of the at least two interrupt signals; and
de-transform the interrupt count and the first pattern of the time difference between each of the at least two interrupt signals to the input data based on the interrupt protocol table.

7. The first electronic device of claim 6, wherein the processor is further configured to:
determine the application running on the first electronic device;
determine a specific pattern of the interrupt count based on a context identity for the application from a context protocol table, wherein the context identity represents at least one context category for the application;
generate a new interrupt protocol table based on the at least one context category for the application; and
send the specific pattern of the interrupt count to the second electronic device indicating the at least one context category for the application.

8. The first electronic device of claim 7, wherein the context protocol table comprises each of applications of the first electronic device mapped to the at least one context category, the context identity associated with the at least one context category and the specific pattern of the interrupt count for the at least one context category.

9. The first electronic device of claim 8, wherein the processor configured to generate the new interrupt protocol table based on the at least one context category for the application is further configured to:
identify the at least one context category for the application;
change the interrupt count and the first pattern of the time difference between each of the at least two interrupt signals for a set of input data; and
generate the new interrupt protocol table with the changed interrupt count and the first pattern of the time difference between each of the at least two interrupt signals for the set of input data.

10. The first electronic device of claim 9, wherein the processor configured to change the interrupt count and the first pattern of the time difference between each of the at least two interrupt signals for the determined set of keys is further configured to:
determine a new priority of the set of input data based on the identified at least one context category, wherein at least one input data of the set of input data that are frequently operated during the identified at least one context category are allocated with a higher priority than other input data in the set of input data; and
determine a new input latency value for the each of the set of input data based on the new priority, wherein the input data with the higher priority are allocated with a lower input latency value than the other input data in the set of input data.

11. The first electronic device of claim 10, wherein the processor configured to change the interrupt count and the first pattern of the time difference between each of the at least two interrupt signals for the determined set of keys is further configured to change the interrupt count and the first pattern of the time difference between each of the at least two interrupt signals for the determined set of input data, based on the new priority and the new input latency value.

12. A second electronic device for communication with a first electronic device on a single wire interface, the second electronic device comprising a processor configured to:
transform, using an interrupt protocol table, an input data into interrupt signals, each of the interrupt signals comprising an interrupt count and a time difference, and transmit the interrupt signals to the first electronic device on the single wire interface interface,
wherein: the interrupt signals are differentiated based on at least one of the interrupt count or the time difference, and
the at least one of the interrupt count or the time difference is determined based on the interrupt protocol table.

13. The second electronic device of claim 12, wherein the processor configured to transform, using the interrupt protocol table, the input data into interrupt signals is further configured to:
decode the input data using an input data mapping table;
determine a value associated with the input data; and
transform the determined value associated with the input data into the interrupt signals using the interrupt protocol table,
wherein the interrupt signals are a combination of an interrupt count and a first pattern of the time difference between each of the interrupt signals.

14. The second electronic device of claim 13, wherein the processor is further configured to:
receive a specific pattern of the interrupt count from the first electronic device;
determine a context identity for an application from the specific pattern of the interrupt count using a context protocol table; and
generate a new interrupt protocol table based on at least one context category for the application.

15. The second electronic device of claim 14, wherein the context protocol table comprises each of applications of the first electronic device, which are mapped to at least one context category, the context identity associated with the at least one context category and the specific pattern of the interrupt count for the at least one context category.

16. A non-transitory computer-readable storage medium that includes a program that, when executed by a processor of a first electronic device, performs the method comprising:
receiving, from a second electronic device, interrupt signals over a single wire interface, each of the interrupt signal including an interrupt count and a time difference and corresponding to an input data provided by a user; decoding the input data corresponding to an interrupt signal based on an interrupt protocol table; and providing the decoded input data to an application running on the first electronic device.

17. The non-transitory computer-readable storage medium of claim 16, wherein the interrupt signals are differentiated based on at least one of the interrupt count or the time difference, and wherein the at least one of the interrupt count or the time difference is determined based on the interrupt protocol table.

18. The non-transitory computer-readable storage medium of claim 17, wherein the method further comprises: incrementing the interrupt count associated with the each of the interrupt signals after receiving the interrupt signals from the second electronic device; storing a current interrupt timestamp associated with the each of the interrupt signals in a memory buffer of the first electronic device; and detecting an end of the input data based on a second pattern of time difference between two interrupt signals of the interrupt signals.

19. The non-transitory computer-readable storage medium of claim 18, wherein decoding the input data associated with the interrupt signals based on the interrupt protocol table comprises:

determining the interrupt count, a first pattern of the time difference between each of the at least two interrupt signals and the second pattern of time difference between two interrupt signals of the at least two interrupt signals; and de-transforming the interrupt count and the first pattern of the time difference between each of the at least two interrupt signals to the input data based on the interrupt protocol table.

20. The non-transitory computer-readable storage medium of claim 19, the method further comprises:

determining the application running on the first electronic device;

determining a specific pattern of the interrupt count based on a context identity for the application from a context protocol table, wherein the context identity represents at least one context category for the application;

generating a new interrupt protocol table based on the at least one context category for the application; and sending the specific pattern of the interrupt count to the second electronic device indicating the at least one context category for the application.

* * * * *